United States Patent [19]
Tokunaga

[11] Patent Number: 5,706,071
[45] Date of Patent: Jan. 6, 1998

[54] LINE OF SIGHT DETECTION APPARATUS AND AN EQUIPMENT HAVING THE LINE OF SIGHT DETECTION APPARATUS

[75] Inventor: Tatsuyuki Tokunaga, Yono, Japan

[73] Assignee: Canon Kabushiki Kaisha, Tokyo, Japan

[21] Appl. No.: 580,449

[22] Filed: Dec. 27, 1995

[30] Foreign Application Priority Data

Dec. 28, 1994 [JP] Japan .................... 6-337456

[51] Int. Cl.$^6$ .................................................. A61B 3/14
[52] U.S. Cl. ........................................... 351/206; 354/402
[58] Field of Search ................................. 351/205, 206, 351/200, 208, 210, 209, 246; 354/402, 432, 64, 219, 62

[56] References Cited

U.S. PATENT DOCUMENTS

| | | | |
|---|---|---|---|
| 5,296,888 | 3/1994 | Yamada | 354/402 |
| 5,486,892 | 1/1996 | Suzuki et al. | 354/402 |

*Primary Examiner*—Hung X. Dang
*Attorney, Agent, or Firm*—Fitzpatrick, Cella, Harper & Scinto

[57] ABSTRACT

A device for detecting a line of sight includes an image pick-up element for picking up an eyeball image of a user, a line of sight detection circuit for detecting the line of sight of the user by calculating an output from the image pick-up element, a maximum value detection circuit for detecting a maximum output value output from the image pick-up element, a comparison circuit for comparing the maximum value with a predetermined threshold value, and an inhibition circuit for inhibiting a line of sight detection operation of the line of sight detection circuit when the maximum value is smaller than the threshold value.

37 Claims, 16 Drawing Sheets

ELECTRICAL CONTROL BLOCK DIAGRAM

| FIG. 5A |
| FIG. 5B |

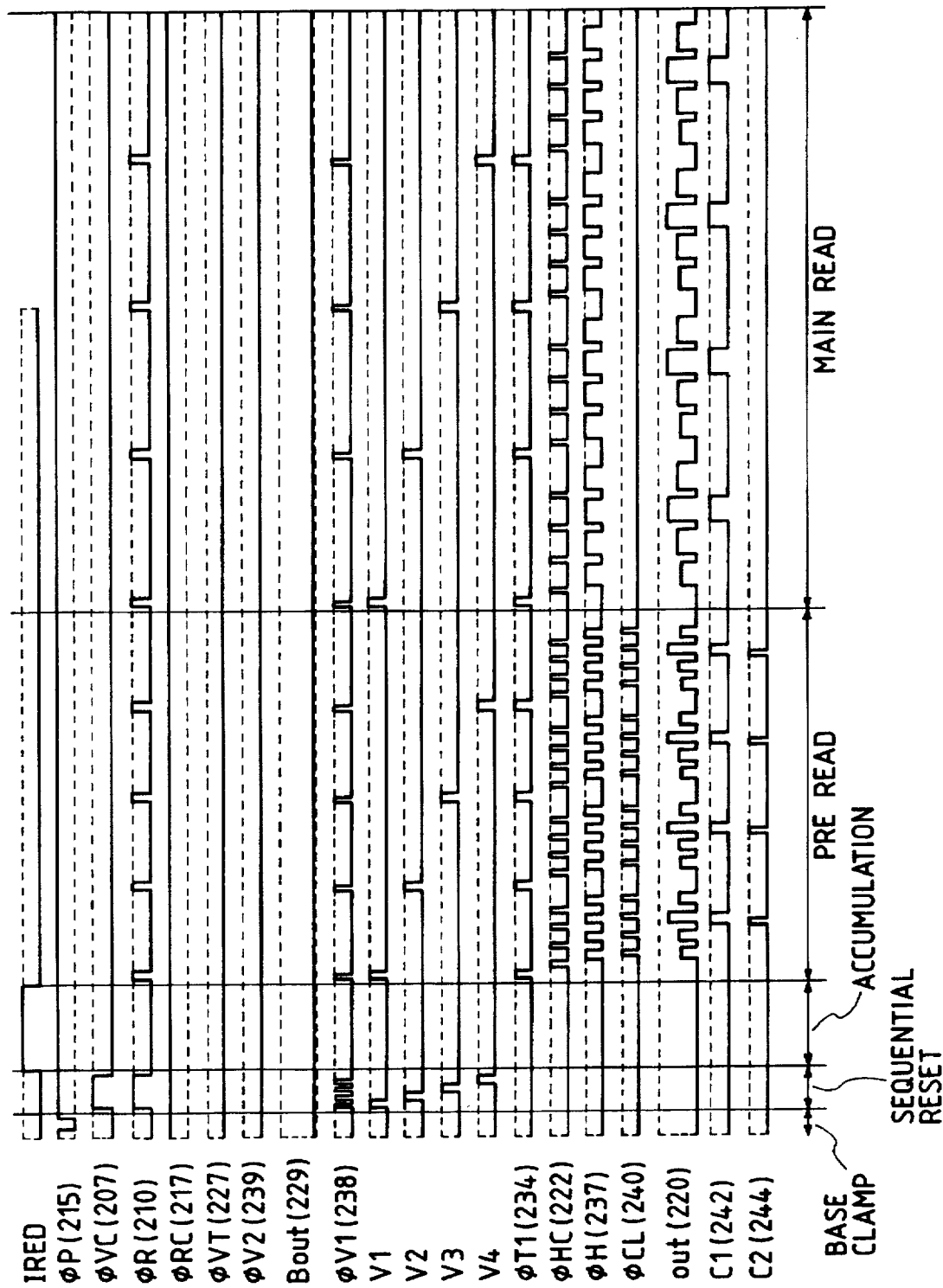

LINE OF SIGHT DETECTION APPARATUS AND AN EQUIPMENT HAVING THE LINE OF SIGHT DETECTION APPARATUS

BACKGROUND OF THE INVENTION

1. Field of the Invention

The present invention relates to a line of sight detection apparatus for detecting the line of sight (gazing point) of a user and an improvement in an equipment having the line of sight detection apparatus.

2. Related Background Art

Conventionally, various kinds of apparatuses (e.g., an eye camera) for detecting the observation position of a photographer on the observation surface, i.e., the line of sight (visual axis) of the photographer have been proposed. For example, in U.S. Pat. No. 5,486,892, a collimated light beam emitted by a light source is projected onto a front eye portion of the eyeball of a photographer, and the gazing point is calculated by utilizing cornea reflection images based on light reflected by the cornea and the imaging position of the pupil. This reference discloses an example wherein the line of sight detection apparatus is built in a single-lens reflex camera, and automatic focus adjustment of a phototaking lens is performed using the line of sight (gazing point) information of the photographer.

FIG. 14 is a schematic view showing a line of sight detection optical system built in a single-lens reflex camera.

Referring to FIG. 14, a photographer observes an object image in a finder while putting his or her eye close to an eyepiece lens 11. Light sources 13a and 13b comprise light-emitting diodes (to be referred to as IREDs hereinafter) for emitting infrared light to which the photographer is insensitive. Some light components of illumination light reflected by the eyeball of the photographer are focused on an area sensor 14 via a light-receiving lens 12.

FIG. 15 is a view for explaining the principle of line of sight detection.

FIG. 15 illustrates an eyeball 15, a cornea 16, an iris 17, and a pupil 19 of the photographer. Note that the eyepiece lens 11 shown in FIG. 14 is not shown, since it is not necessary in the description.

The line of sight detection method will be described below with reference to FIGS. 14 and 15.

Infrared light emitted by the IRED 13b is irradiated onto the cornea 16 of the eyeball 15 of the observer. At this time, a cornea reflection image d (virtual image) formed by some light components of the infrared light reflected by the surface of the cornea 16 is focused by the light-receiving lens 12, and is formed at a position d' on the area sensor 14. Similarly, infrared light emitted by the IRED 13a illuminates the cornea 16 of the eyeball 15. At this time, a cornea reflection image e formed by some light components of the infrared light reflected by the surface of the cornea 16 is focused by the light-receiving lens 12, and is formed at a position e' on the area sensor 14.

Light beams from edge portions a and b of the iris 17 form the images of the edge portions a and b at positions a' and b' on the area sensor 14 via the light-receiving lens 12. If the x-coordinate of the center, c, of a circle (to be referred to as a pupil circle) defined by the boundary between the pupil and the iris 17 is represented by Xc, its x-coordinate on the area sensor 14 is represented by Xc'.

FIG. 16A is a schematic view of an eyeball image projected onto the area sensor 14, and FIG. 16B shows the intensity distribution of an output signal 60 from an output line I—I in FIG. 16A.

The eyeball image shown in FIG. 16A includes a white portion 50 of the eyeball, a pupil portion 51, and cornea reflection images 52a and 52b formed by the pair of IREDs. These cornea reflection images 52a and 52b are called "Purkinje images", and will be referred to as "P images" hereinafter.

The x-coordinate of the middle point between the P images d and e substantially matches an x-coordinate xo of the center of curvature, o, of the cornea 16. For this reason, if the x-coordinates of the generation positions d and e of the P images are represented by xd and xe, and a standard distance from the center of curvature o of the cornea 16 to the center c of the pupil is represented by $L_{OC}$, a rotation angle θx of an optical axis 15a of the eyeball 15 substantially satisfies:

$$L_{OC} * \sin \theta x \equiv (xd+xe)/2 - xc \tag{1}$$

For this reason, as shown in FIG. 16A, by detecting the positions of the respective feature points (P images and the center of the pupil) of the eyeball 15 protected onto the area sensor 14, the rotation angle θ of the optical axis 15a of the eyeball 15 can be obtained.

From formula (1), the rotation angle of the optical axis 15a of the eyeball 15 is given by:

$$\beta * L_{OC} * \sin \theta x \equiv \{(xpo-\delta x)-xic\} * pitch \tag{2}$$

$$\beta * L_{OC} * \sin \theta y \equiv \{(ypo-\delta y)-yic\} * pitch \tag{3}$$

where θx is the rotation angle of the eyeball optical axis in a z-x plane, and θy is the rotation angle of the eyeball optical axis in a y-x plane. (xpo, ypo) are the coordinates of the middle points between the two P images on the area sensor 14, and (xic, yic) are the coordinates of the center of the pupil on the area sensor 14. The "pitch" is the picture element pitch of the area sensor 14. β is the imaging magnification determined by the position of the eyeball 15 with respect to the light-receiving lens 12, and in practice, the imaging magnification is obtained as a function of the interval between the two P images. δx and δy are correction terms for correcting the coordinates of the middle point between the P images, i.e., for correcting errors caused since the eyeball of the photographer is illuminated with not collimated light but divergent light. As for δy, a correction term for correcting an offset component generated since the eyeball of the photographer is illuminated with divergent light from the direction of the lower eyelid is also included.

After the rotation angles (θx, θy) of the eyeball optical axis of the photographer are calculated, if the camera posture is the horizontal position, a gazing point (x, y) on the observation surface (focusing plate) of the photographer is calculated by:

$$x = m * (\theta x + \Delta) \tag{4}$$

$$y = m * \theta y \tag{5}$$

Note that the x-direction indicates the horizontal direction with respect to the photographer when the camera posture is the horizontal position, and the y-direction indicates the vertical direction with respect to the photographer when the camera posture is the horizontal position. In the above formulas, m is a conversion coefficient for converting the rotation angle of the eyeball 15 into a coordinate on the focusing plate, and Δ is the angle defined by the eyeball optical axis 15a and the line of sight (gazing point). As is generally known, a deviation between the rotation angle of the eyeball and the actual line of sight of the observer is about 5° in the horizontal direction with respect to the observer, and is almost zero in the vertical direction.

The above-mentioned calculations for obtaining the line of sight (gazing point) of the photographer are executed by a software program in a microcomputer in the line of sight detection apparatus on the basis of the above formulas.

Then, the position, on the focusing plate, of the line of sight of the photographer who looks into the finder of the camera is calculated, and the calculated line of sight information is utilized in focus adjustment of the phototaking lens or a phototaking mode setting operation of the camera.

In order to actually obtain the line of sight, the eyeball image on the area sensor is processed by, e.g., a microprocessor to detect the above-mentioned P images and the pupil circle, and the line of sight is calculated based on the detected position information.

The detailed method is disclosed in, e.g., U.S. patent application No. 08/387,614.

According to this reference, photoelectric conversion signals of all the picture elements on the area sensor are read and A/D-converted, and the coordinates of the P images and the pupil circle are stored by sequential processing. The method of calculating the coordinates of the P images will be briefly explained below. The coordinates of the P images are detected when the luminance of a picture element of interest is higher than a predetermined level. The pupil circle is extracted by utilizing the luminance difference of the boundary between the pupil and iris. At this time, it is discriminated based on a minimum luminance value by the sequential processing if the picture element of interest is suitable for an edge point. For this reason, after signals from all the picture elements are read and the sequential processing ends, it is discriminated again based on the minimum luminance value of all the picture elements if a picture element of interest is suitable for an edge point. Using remaining edge points, the edge coordinates of the pupil are calculated by the method of least squares to estimate a circle, and the estimated circle is used as the pupil circle.

As described above, in order to perform line of sight detection, signals from all the picture elements on the area sensor are A/D-converted, and the feature points of the eyeball are extracted by the sequential processing. For this reason, in order to quickly perform this processing, the operation frequency of the microcomputer must be maximized. However, as the operation frequency of the microcomputer becomes higher, a consumption current increases. In an equipment such as a camera driven by a power supply such as a battery, the battery is considerably consumed.

Especially, as shown in FIG. 17, in, e.g., a mode for repeating the line of sight detection operation and the focus adjustment operation for a moving object, since the microcomputer continues the line of sight detection operation, its operation frequency is maximized, and its consumption current increases. In this mode, even when the photographer does not look into the finder, the line of sight detection operation is always activated. As a result, the consumption current further increases, and the battery is considerably consumed.

SUMMARY OF THE INVENTION

According to one aspect of the invention, prior to execution of a processing routine of an eyeball image signal received by an image sensor, it is checked if the image satisfies a predetermined criterion, thereby discriminating the presence/absence of the eyeball. If it is determined that the eyeball is not present, the processing routine is not started. Since the processing routine is not operated wastefully, the consumption power of the apparatus can be reduced.

BRIEF DESCRIPTION OF THE DRAWINGS

FIG. 11 is a timing chart showing the operation upon line of sight detection of a camera according to the second embodiment of the present invention;

DESCRIPTION OF THE PREFERRED EMBODIMENTS

The present invention will be described in detail hereinafter with reference to the illustrated embodiments.

Figure 1:
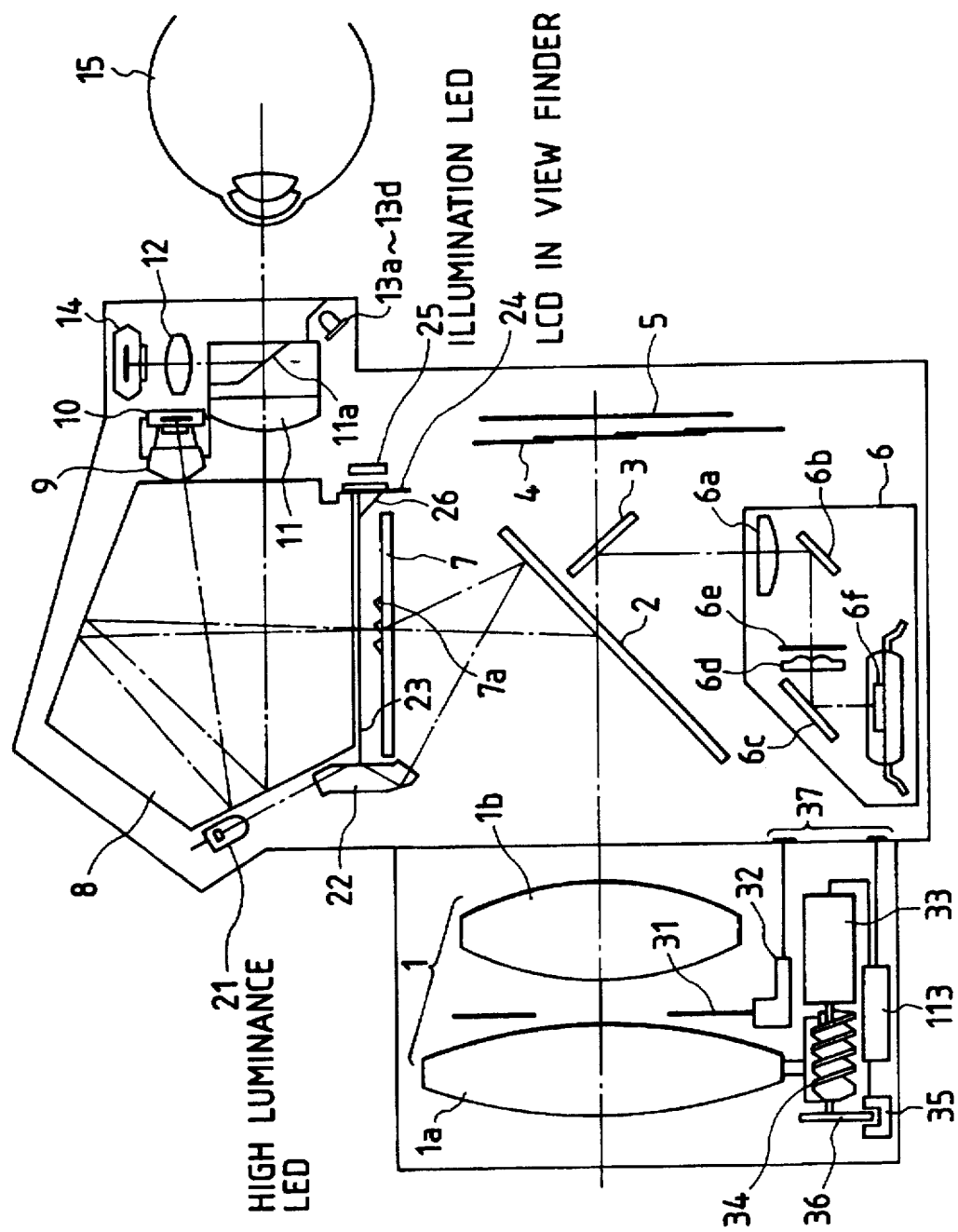
FIG. 1 is a sectional view showing the arrangement of a principal part of a single-lens reflex camera comprising a line of sight detection apparatus according to the first embodiment of the present invention.
Figure 3:
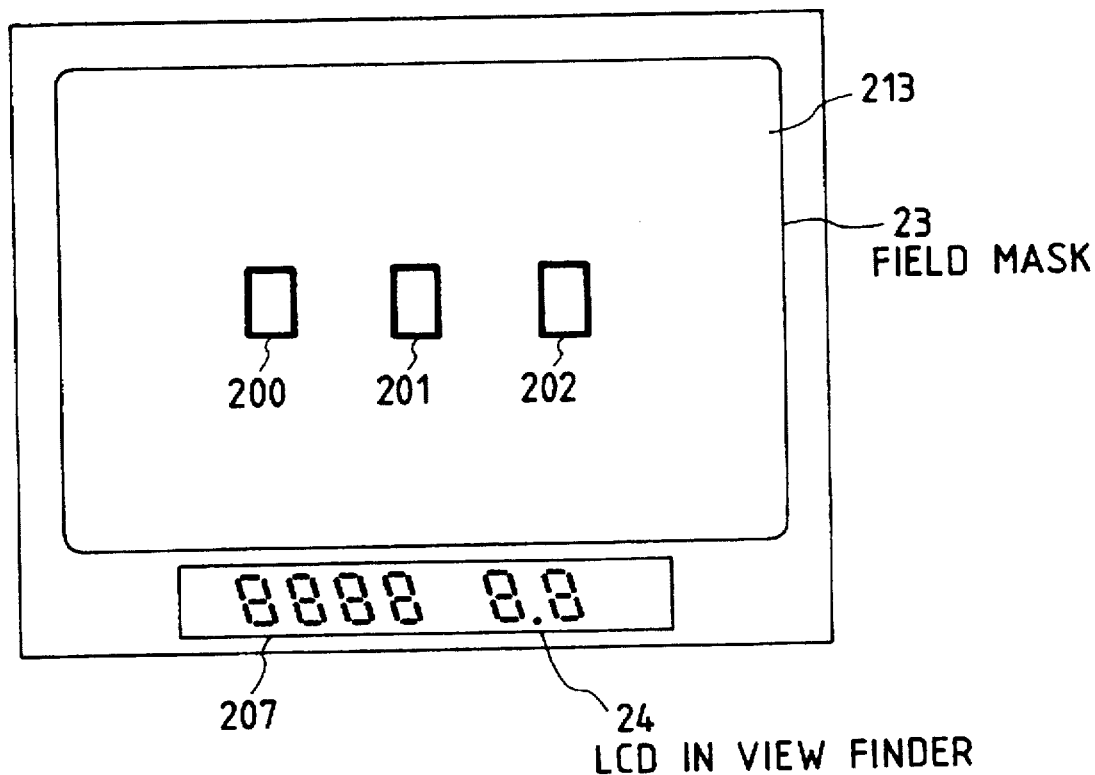
FIG. 3 is a view showing the state in the finder field shown in FIG. 1.

FIG. 1 is a sectional view showing the arrangement of a principal part of a camera when a line of sight detection apparatus is applied to a single-lens reflex camera according to the first embodiment of the present invention, and FIG. 3 shows the finder field of the single-lens reflex camera shown in FIG. 1.

Referring to FIG. 1, a phototaking lens 1 is constituted by two lenses 1a and 1b for the sake of simplicity. However, in practice, the lens 1 is constituted by a larger number of lenses. A main mirror 2 is obliquely inserted into or retracted from a phototaking optical path in correspondence with the observation state and the phototaking state. A sub mirror 3 reflects downward a light beam transmitted through the main mirror 2. A shutter 4 is arranged behind these mirrors. A photosensitive member 5 comprises a silver halide film or a solid-state image pick-up element such as a CCD, a MOS type element, or the like.

A focus detection device 6 adopts a known phase difference method, and is constituted by a field lens 6a disposed in the vicinity of the imaging surface, reflection mirrors 6b and 6b, a secondary imaging lens 6d, an aperture 6e, a line sensor 6f consisting of a plurality of CCDs (to be described later), and the like. The focus detection device 6 shown in FIG. 1 can perform focus detection on a plurality of areas (three distance measurement point marks 200 to 202) in a finder field (observation screen) 213, as shown in FIG. 3.

A focusing plate 7 is disposed on a prospective imaging surface of the phototaking lens 1, and a pentagonal prism 8 is used for bending the finder optical path. An imaging lens 9 and a photometric sensor 10 are used for measuring the object luminance in the observation screen. The imaging lens 9 defines a conjugate relationship between the focusing plate 7 and the photometric sensor 10 via the reflection optical path in the pentagonal prism 8.

An eyepiece lens 11 is disposed behind the exit surface of the pentagonal prism 8, and is used for observing the focusing plate 7 by an eye 15 of a photographer. The eyepiece lens 11 comprises, e.g., a beam splitter 11a comprising a dichroic mirror which transmits visible light therethrough and reflects infrared light. A light-receiving lens 12 is arranged above the eyepiece lens 11. An area sensor 14 is constituted by two-dimensionally arranging photoelectric conversion element arrays such as CCDs. The area sensor 14 is disposed to be conjugate with a position in the vicinity of the iris of the eye 15 of the photographer, which is located at a predetermined position, with respect to the light-receiving lens. The detailed circuit arrangement of the area sensor 14 will be described later.

IREDs 13 (13a to 13d=IRED1 to IRED4) serve as illumination light sources for illuminating the eyeball 15 of the photographer.

High-luminance superimposed LEDs 21 can be visually confirmed even in a bright object. Light emitted by each superimposed LED 21 is reflected by the main mirror 2 via a light projection prism 22, and is bent in the vertical direction by micro-prism arrays 7a formed on a display portion of the focusing plate 7. Then, the light reaches the eye 15 of the photographer via the pentagonal roof prism 8 and the eyepiece lens 11. Thus, the micro-prism arrays 7a are formed in frame patterns at positions corresponding to the focus detection areas on the focusing plate 7, and are respectively illuminated with the corresponding superimposed LEDs 21 (LED-L1, LED-L2, LED-C, LED-R1, and LED-R2). As can be seen from the finder field shown in FIG. 3, the distance measurement point marks 200, 201, and 202 shine in the finder field 213 to display the focus detection areas (distance measurement points) (this display will be referred to as a superimposed display hereinafter).

A field mask 23 forms the finder field area. An LCD 24 in the finder is used for displaying phototaking information on a portion outside the finder field, and is illuminated with an illumination LED (F-LED) 25. Light transmitted through the LCD 24 in the finder is guided into the finder via a triangular prism 26, and is displayed on a portion 207 outside the finder field shown in FIG. 3. The photographer can observe the displayed phototaking information.

The phototaking lens 1 includes an aperture 31, an aperture driving device 32 including an aperture driving circuit 114 (to be described later), a lens driving motor 33, and a lens driving member 34 consisting of, e.g., a driving gear and-the like. A photocoupler 35 detects the rotation of a pulse plate 36 interlocked with the lens driving member 34, and supplies the rotation information to a lens focus adjustment circuit 113. The lens focus adjustment circuit 113 drives the lens driving motor 33 by a predetermined amount on the basis of this rotation information and information of a lens driving amount supplied from the camera side, thereby moving a focusing lens 1a of the phototaking lens 1 to an in-focus position. Mount contacts 37 serve as a known interface between the camera and the lens.

Figure 2:
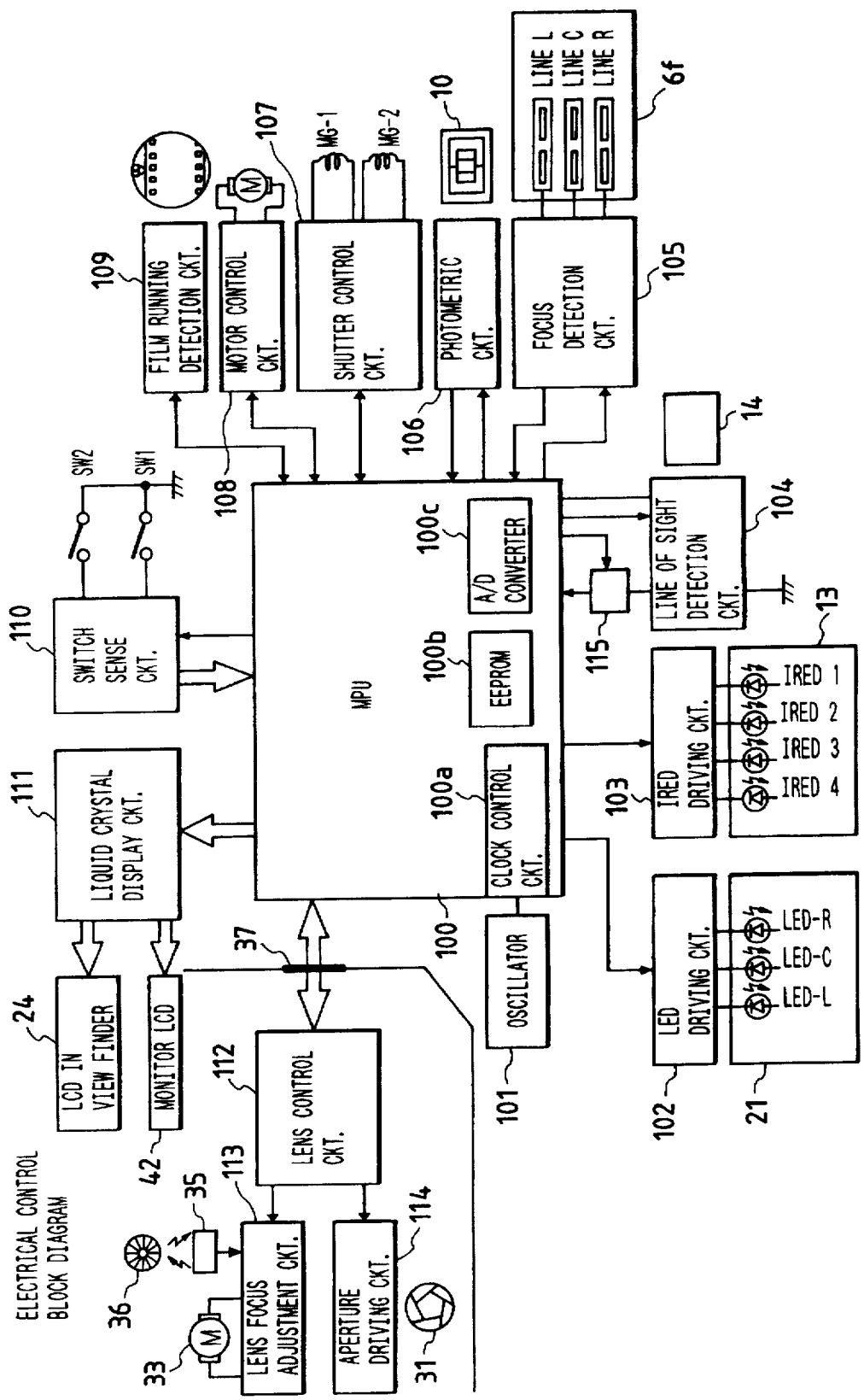
FIG. 2 is a block diagram showing the electrical arrangement of the camera shown in FIG. 1.

FIG. 2 is a block diagram showing the electrical arrangement of the single-lens reflex camera with the above-mentioned arrangement, and the same reference numerals in FIG. 2 denote the same parts as in FIG. 1.

A central processing device (to be referred to as an MPU hereinafter) 100 comprises a microcomputer serving as a built-in camera control means of the camera main body. The MPU 100 performs its internal operations on the basis of clocks generated by an oscillator 101.

A clock control circuit 100a determines the operation frequency of the MPU 100 by "not frequency-dividing", "frequency-dividing to ½", or "frequency-dividing to ¹⁄₁₆" the original oscillation frequency generated by the oscillator 101 in accordance with an internal signal of the MPU 100. An EEPROM 100b is a memory which can store a film counter and other phototaking information. An A/D converter 100c A/D-converts analog signals from a line of sight detection circuit 104, a focus detection circuit 105, and the multi-split photometric sensor 10 (photometric circuit 106), as will be described later.

The MPU 100 is connected to an LED driving circuit 102, an IRED driving circuit 103, the line of sight detection circuit 104, the focus detection circuit 105, the photometric circuit 106, a shutter control circuit 107, a motor control circuit 108, a film running detection circuit 109, a switch sense circuit 110, and a liquid crystal display circuit 111. The MPU 100 exchanges signals with a lens control circuit 112 arranged in the phototaking lens via the mount contacts 37 shown in FIG. 1.

The LED driving circuit 102 turns on the superimposed LEDs 21 in accordance with a signal from the MPU 100. The IRED driving circuit 102 turns on the IREDs 13 in accordance with a signal from the MPU 100.

The line of sight detection circuit 104 performs an accumulation operation and a read operation of the area sensor 14 in accordance with a signal from the MPU 100, and supplies picture element output analog signals of respective picture elements to the MPU 100. Note that the line of sight detection circuit 104 will be described in detail later. The MPU 100 A/D-converts these analog signals using the A/D converter 100c, extracts the respective feature points of the eyeball image required for line of sight detection in accordance with a predetermined algorithm on the basis of each picture element information, as will be described later, and calculates the rotation angle of the eyeball of the photographer on the basis of the positions of the feature points.

In the single-lens reflex camera to which this embodiment is applied, the line of sight (gazing point), on the finder, of the photographer is extracted by the calculations, one of the three distance measurement points 200 to 202 is selected, and automatic focus detection is performed using the selected distance measurement point.

A regulator 115 supplies a power supply voltage to the line of sight detection circuit 104 in accordance with a signal from the MPU 100, and is controlled to supply the power supply voltage only when the line of sight detection operation is performed.

The line sensor 6f comprises a CCD line sensor constituted by three line sensors Line-L, Line-C, and Line-R corresponding to the three distance measurement points 200 to 202 in the screen, as described above. The focus detection circuit 105 performs accumulation control and read control of these sensor portions of the line sensor 6f, and outputs each picture element information to the MPU 100.

The MPU 100 A/D-converts this information, and performs focus detection based on the phase difference detection method. Then, the MPU 100 performs focus adjustment of the lens by exchanging signals with the lens control circuit 112.

The photometric circuit 106 outputs the output signal from the photometric sensor 10 to the MPU 100 as a luminance signal in each area in the screen. The MPU 100 A/D-converts the luminance signal, and adjusts an exposure amount of a phototaking operation.

The shutter control circuit 107 runs forward and rearward shutter curtains (MG-1 and MG-2) in accordance with a signal from the MPU 100, thus performing an exposure operation.

The motor control circuit 108 controls a motor in accordance with a signal from the MPU 100, thus performing an up/down operation of the main mirror 2, a shutter charging operation, and a film feeding operation.

The film running detection circuit 109 detects if the film is wound up by one frame in a film feeding operation, and supplies a signal to the MPU 100.

A switch SW1 is turned on at the first stroke position of a release button (not shown), and is used for starting photometric, AF, and line of sight detection operations. A switch SW2 is turned on at the second stroke position of the release button, and is used for starting an exposure operation. Signals from these switches SW1 and SW2, and other operation members (not shown) of the camera are detected by the switch sense circuit 110, and are then supplied to the MPU 100.

The liquid crystal display circuit 111 controls the LCD 24 in the finder and a monitor LCD 42 in accordance with a signal from the MPU 100.

The lens control circuit 112 communicates with the MPU 100 via the lens mount contacts 37 to operate the lens focus detection circuit 113 and the aperture control circuit 114, thereby controlling the focus adjustment and aperture of the lens.

Figure 4:
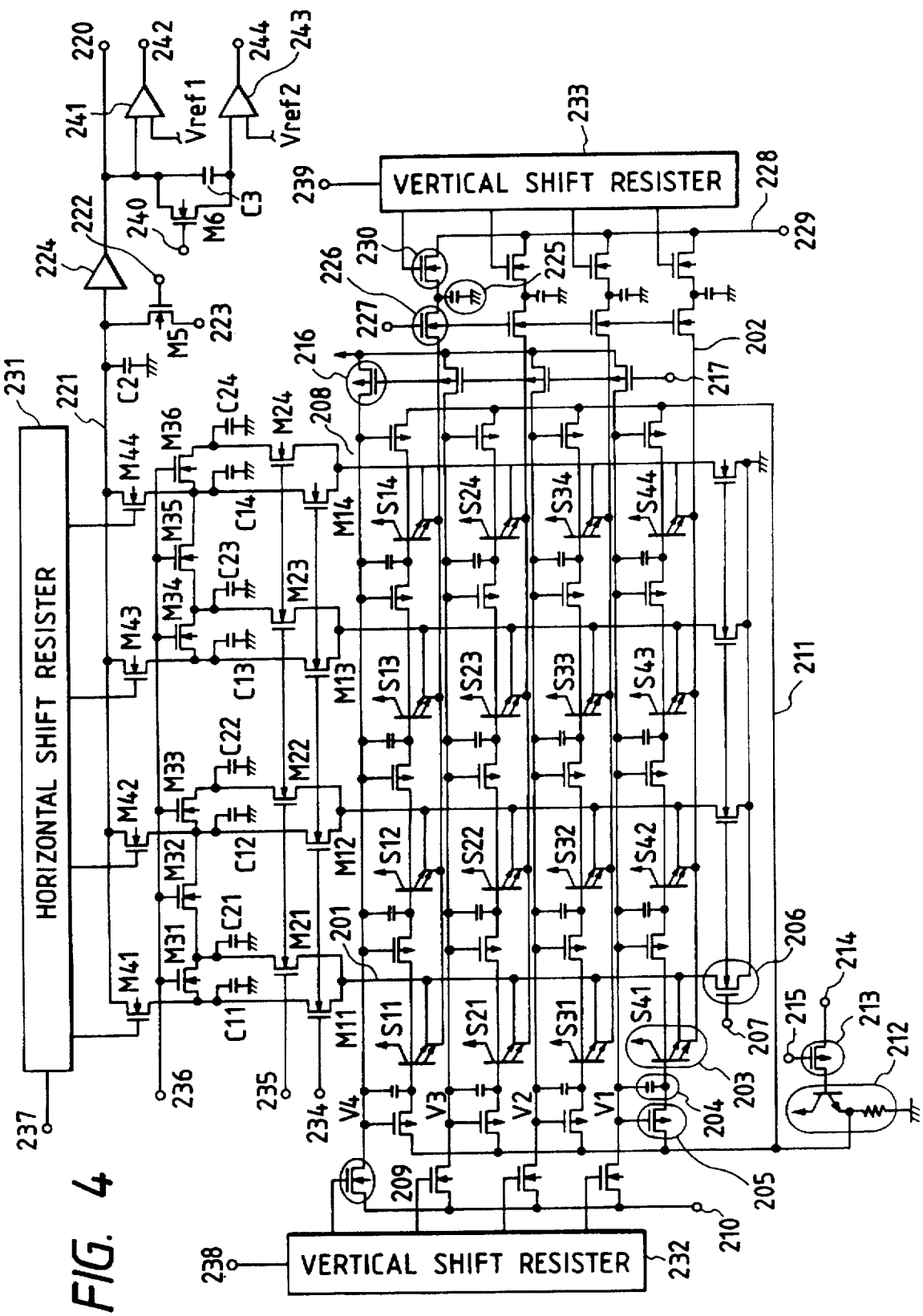
FIG. 4 is a circuit diagram showing in detail a line of sight detection circuit shown in FIG. 2.

The detailed circuit arrangement and operation of the line of sight detection circuit 104 will be described below with reference to FIG. 4.

The area sensor is assumed to have a size of 150 picture elements in the horizontal direction×100 picture elements in the vertical direction. However, for the sake of simplicity in the description of the circuit, the area sensor illustrated in FIG. 4 has a size of four picture elements in the horizontal direction×four picture elements in the vertical direction. In addition to a function of reading the respective picture element outputs of the sensor, the line of sight detection circuit has a function of reading a picture element output maximum value (peak output) of a block as one horizontal line of the sensor, and a function of analyzing image information by performing analog processing of the peak output.

One photoelectric conversion element comprises a bipolar transistor 203 which accumulates a light charge on its base, and has double emitters. The first emitter of the bipolar transistor is connected to an output line 201, and the second emitter is connected to an output line 202. In each element, a capacitor 204 controls the base potential of the bipolar transistor 203, and a PMOS transistor 205 resets the base. MOS transistors 206 are used for connecting the corresponding vertical output lines 201 to the ground potential, and a terminal 207 is used for applying a pulse to the gates of the MOS transistors 206. Horizontal driving lines 208 control the base potentials of the bipolar transistors 203 via the capacitors 204 to perform a reset/read operation of the picture elements. Buffer MOS transistors 209 are enabled when an output from a vertical shift register 232 is applied to their gates, and select picture element rows to be driven. A terminal 210 is used for applying a picture element driving pulse.

A wiring line 211 is connected to the drains of the PMOS transistors 205 at the right and left ends. An emitter follower circuit 212 has an output connected to the wiring line 211. A MOS transistor 213 controls the base potential of the emitter follower circuit 212. A power supply terminal 214 is connected to the drain terminal of the MOS transistor 213. A terminal 215 is used for applying a pulse to the gate of the MOS transistor 213.

Each of PMOS transistors 216 has a drain fixed at a positive potential. A terminal 217 is used for applying a pulse to the gates of the transistors 216.

Capacitors C11, C21, ..., C14, C24 accumulate picture element output potentials output via the vertical output lines 201, and MOS transistors M11, M21, ..., M14, M24 are used for performing switching operations between the output lines 201 and the capacitors C11, C21, ..., C14, C24. Terminals 234 and 235 are used for applying pulses to the gates of the transistors M11, M21, ..., M14, M24. A horizontal output line 221 has a parasitic capacitance C2.

Switch MOS transistors M41, ..., M44 electrically connect the capacitors C11, C21, ..., C14, C24 to the horizontal output line 221 when they are selected by an output from a horizontal shift register 231. A MOS transistor M5 is used for connecting the horizontal output line 221 to the ground potential. A terminal 222 is used for applying a pulse to the gate of the transistor M5. The transistor M5 is connected to a ground level 223. An amplifier 224 receives the potential on the output line 221, and has an output terminal 220.

Capacitors 225 accumulate picture element output potentials output via the output lines 202. MOS transistors 226 are used for performing switching operations between the output lines 202 and the capacitors 225. A terminal 227 is used for applying a pulse to the gates of the transistors 226. An output line 228 supplies the potentials from the capacitors 225, and has an output terminal 229. Switch MOS transistors 230 are selected by an output from a vertical shift register 233, and sequentially electrically connect the capacitors 225 and the output line 228.

The vertical shift register 232 receives a driving pulse via a terminal 238. The vertical shift register 233 receives a driving pulse via a terminal 239. The horizontal shift register 231 receives a driving pulse via a terminal 237.

MOS transistors M31, ...., M16 directly connect the capacitors C11, C21, ..., C14, C24 in units of blocks, and a terminal 236 is used for applying a pulse to the gates of these MOS transistors.

A comparator 241 compares the output from the amplifier 224 with a reference potential Vref1, and the output from the comparator 241 is output from an output terminal 242.

A MOS transistor M6 is used for clamping the input to a comparator 243 to the output from the amplifier 224 in response to a pulse signal 240 input to its gate. After application of the pulse signal 240, a capacitor C3 inputs the potential difference between the clamped output potential of amplifier 224 and that after clamping to the comparator 243. The potential difference is compared with a reference voltage Vref2, and a comparison result is output from a terminal 244.

The operation of the single-lens reflex camera according to the embodiment of the present invention will be described below with reference to FIGS. 5A to 9.

Figures 5, 5A:
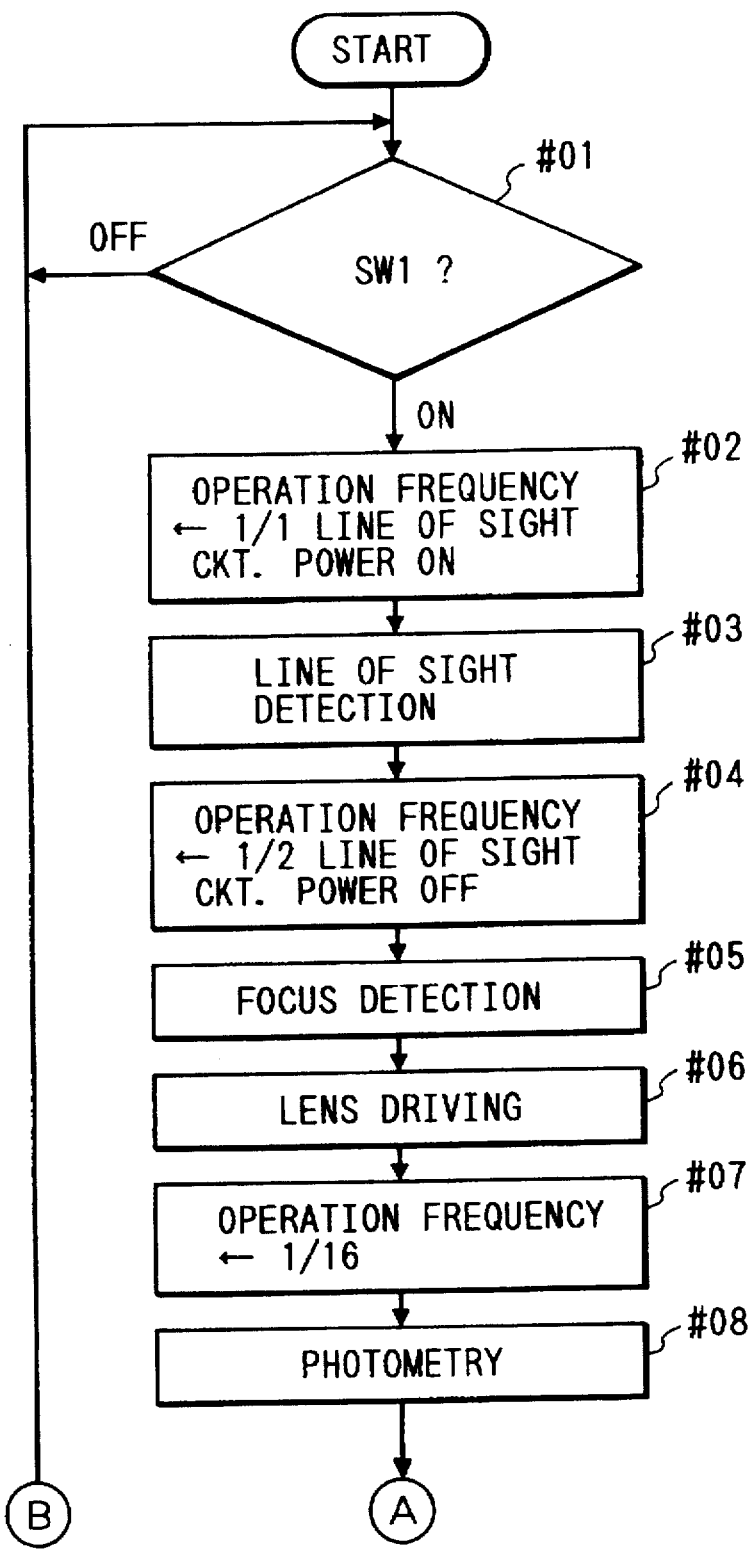
FIG. 5, comprised of FIGS. 5A and 5B, is a flow chart showing a series of operations of the camera according to the first embodiment of the present invention.
Figure 5B:
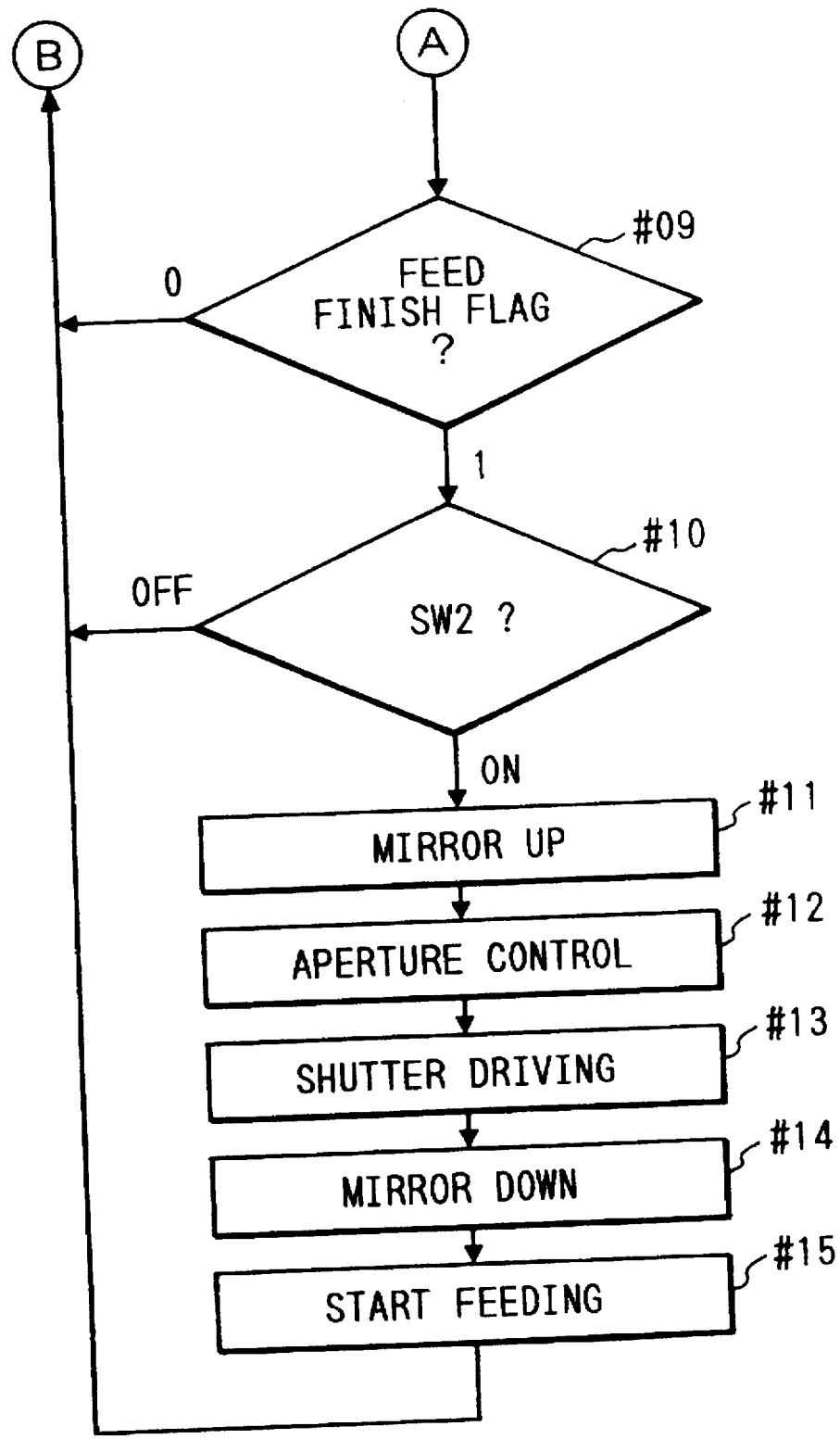

Referring to FIGS. 5A and 5B, when the operation of the camera is started, the MPU 100 detects the state of the switch SW1, which is turned on at the first stroke position of the release button, in step (#01). As a result, if the switch SW1 is ON, the operation frequency of the MPU 100 is set to be 1/1 in step (#02), and a "line of sight detection" subroutine is called to the line of sight detection circuit 104 in step (#03). At this time, since the operation frequency is 1/1, the consumption current becomes maximum.

The "line of sight detection" subroutine will be described below with reference to FIG. 7.

When the line of sight detection operation is started in step (#000), data are initialized in step (#001). A variable EDGCNT is used for counting the number of extracted edges of the boundary between the iris and pupil. Variables IP1, IP2, JP1, and JP2 represent the positions of cornea reflection images (P images) of the IREDs 13a to 13d, and two P images are present in an area of an eyeball reflection image surrounded by a range from IP1 to IP2 in the horizontal direction (x-axis) and a range from JP1 to JP2 in the vertical direction (y-axis).

The area sensor 14 is assumed to have a size of 150 picture elements in the horizontal direction×100 picture elements in the vertical direction. Thus, the variables IP1, IP2, JP1, and JP2 respectively store central positions (75, 50) of the entire sensor as initial values.

After the data are initialized, the flow advances to step (#002).

In step (#002), the IREDs 13 for illuminating the eye of the photographer are turned on, and the accumulation operation of the area sensor 14 is performed.

Figure 10:
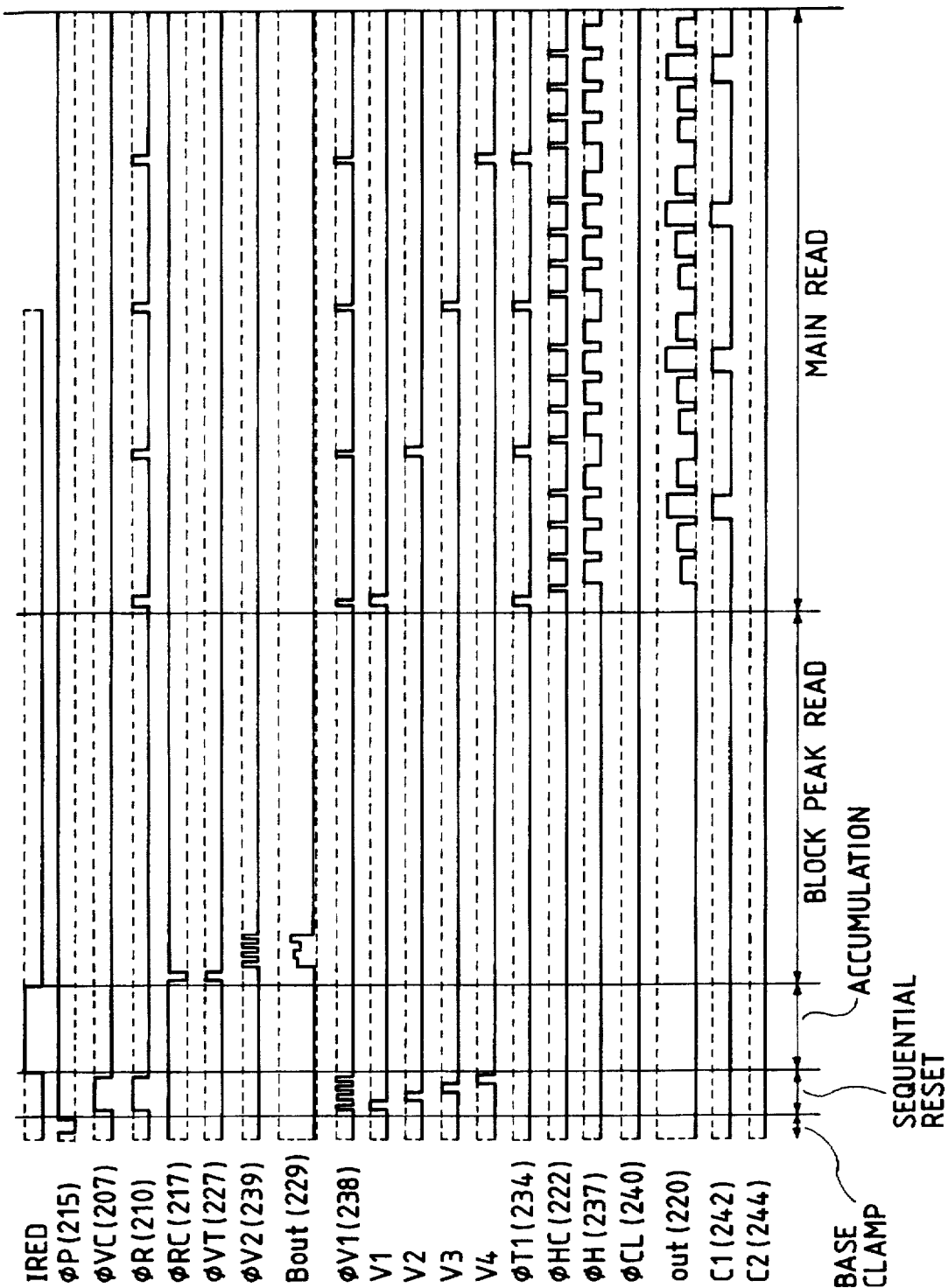
FIG. 10 is a timing chart showing the operation upon line of sight detection of the camera according to the first embodiment of the present invention.

FIGS. 10 and 11 are timing charts showing the operation of the line of sight detection circuit 104 including the area sensor 14. The accumulation operation of the area sensor 14 in step (#002) will be described below with reference to FIG. 10.

Base Clamp

First, a pulse $\phi P$ (215) changes to Low level to set the emitter follower circuit 212 to have a positive output potential. At this time, the potential of the driving line 208 connected to the bases of the PMOS transistors 205 is at Low level, and the PMOS transistors 205 are turned on, thus setting the base potentials of the bipolar transistors 203 in all the picture elements to be equal to the output potential of the emitter follower circuit 212.

Sequential Reset

The pulse $\phi P$ (215) changes to High level to set the emitter follower circuit 212 to have a GND (ground) output potential, and thereafter, a pulse $\phi VC$ (207) changes to High level to ground the vertical output lines 201. With this operation, the emitter potentials of the first emitters are supplied to the bipolar transistors 203 of the respective picture elements, thereby lowering their base potentials. Furthermore, the vertical shift register 232 is activated by a driving pulse $\phi V1$ (238) to apply a pulse $\phi R$ (210) to the horizontal driving lines 208 in units of rows. The base potential of each picture element in a row corresponding to the driving line 208 which changes to High level is temporarily raised by capacitor coupling of the capacitor 204, but lowers since the emitter current of the first emitter flows. When the potential of the line 208 goes Low, the base potential of each picture element becomes a minus potential due to the capacitor coupling, and the first emitter-base path is set in a reverse bias state.

Accumulation

At the time of the reverse bias state, the IREDs 13 are turned on, and the eyeball image of the photographer is projected onto the area sensor 14. In each picture element, a charge generated by incident light is accumulated on its base, and the base potential rises in correspondence with the accumulated charge amount. After an elapse of a predetermined accumulation time, the IREDs 13 are turned off, thus completing the accumulation.

Referring back to FIG. 7, upon completion of sensor accumulation in step (#002), the flow advances to step (#003) to perform a pre-read operation.

The pre-read operation is the important point of this embodiment, and will be described below in two embodiments.

The pre-read operation according to the first embodiment of the present invention will be described below with reference to the timing chart of FIG. 10 showing the operation of the line of sight detection circuit 104.

A pulse $\phi RC$ (217) changes to Low level to turn on the PMOS transistors 216, thus setting all the horizontal driving lines 208 at High level. At this time, the base potential of each picture element is raised by the capacitor coupling, and its base-emitter potential is set in a forward bias state. As a result, the output values from maximum output picture elements in the respective row appear on the corresponding output lines 202, and the potentials on the output lines 202 are accumulated on the accumulation capacitors 225 via the MOS transistors 226 in response to a pulse $\phi VT$ (227).

Then, the vertical shift register 233 is activated in response to a pulse $\phi V2$ (239) to sequentially output the potentials on the capacitors 225 from the output terminal 229. These signals are A/D-converted by the internal A/D converter 100c of the MPU 100, and the MPU 100 compares the A/D-converted output values of the maximum output picture elements in the respective horizontal lines with a predetermined discrimination level.

Referring back to FIG. 7, if at least one A/D-converted value exceeds the predetermined level, it is determined in step (#004) that P images based on the eyeball images of the photographer are present on the area sensor 14, and the flow advances to step (#009) and the subsequent steps.

On the other hand, if none of the A/D-converted values exceed the predetermined level, no eyeball image is present on the area sensor 14. That is, it is determined that the photographer does not look into the finder, and the flow advances to step (#018), thus ending the line of sight detection operation.

In step (#009), so-called "loop processing" is executed, i.e., the processing steps in the frame are executed while counting up a loop variable J from 0 to 99.

If it is determined in step (#010) that the y-coordinate falls outside the range from 0 to 99, it is determined that the loop processing in step (#009) ends, and the flow advances to step (#015).

On the other hand, if the y-coordinate falls within the range from 0 to 99, the flow advances to step (#011), and photoelectric conversion signals in one line in the horizontal direction (x-axis) of the area sensor 14 are read.

The read operation (main read) will be described below with reference to the timing chart in FIG. 10.

The vertical shift register 232 is activated in response to a driving pulse φV1 (238), and the first horizontal driving line 208 (V1) changes to High level in response to a pulse φR (210). At the same time, the respective picture element outputs of the first line are accumulated on the capacitors C11, . . . , C14 via the transistors M11, . . . , M14 in response to a pulse φT1 (234). The horizontal shift register 231 is activated by a driving pulse φH (237), and the respective picture element outputs of the first line accumulated on the capacitors C11, . . . , C14 are read from the output terminal 220 by the MPU 100 via the amplifier 224.

Upon completion of the processing for the first line, the second horizontal driving line 208 (V2) changes to High level in response to a driving pulse φ1 (238), and respective picture element outputs of the second line are read by the MPU 100 by the similar operations. The same applies to the third and fourth lines.

Figure 8:
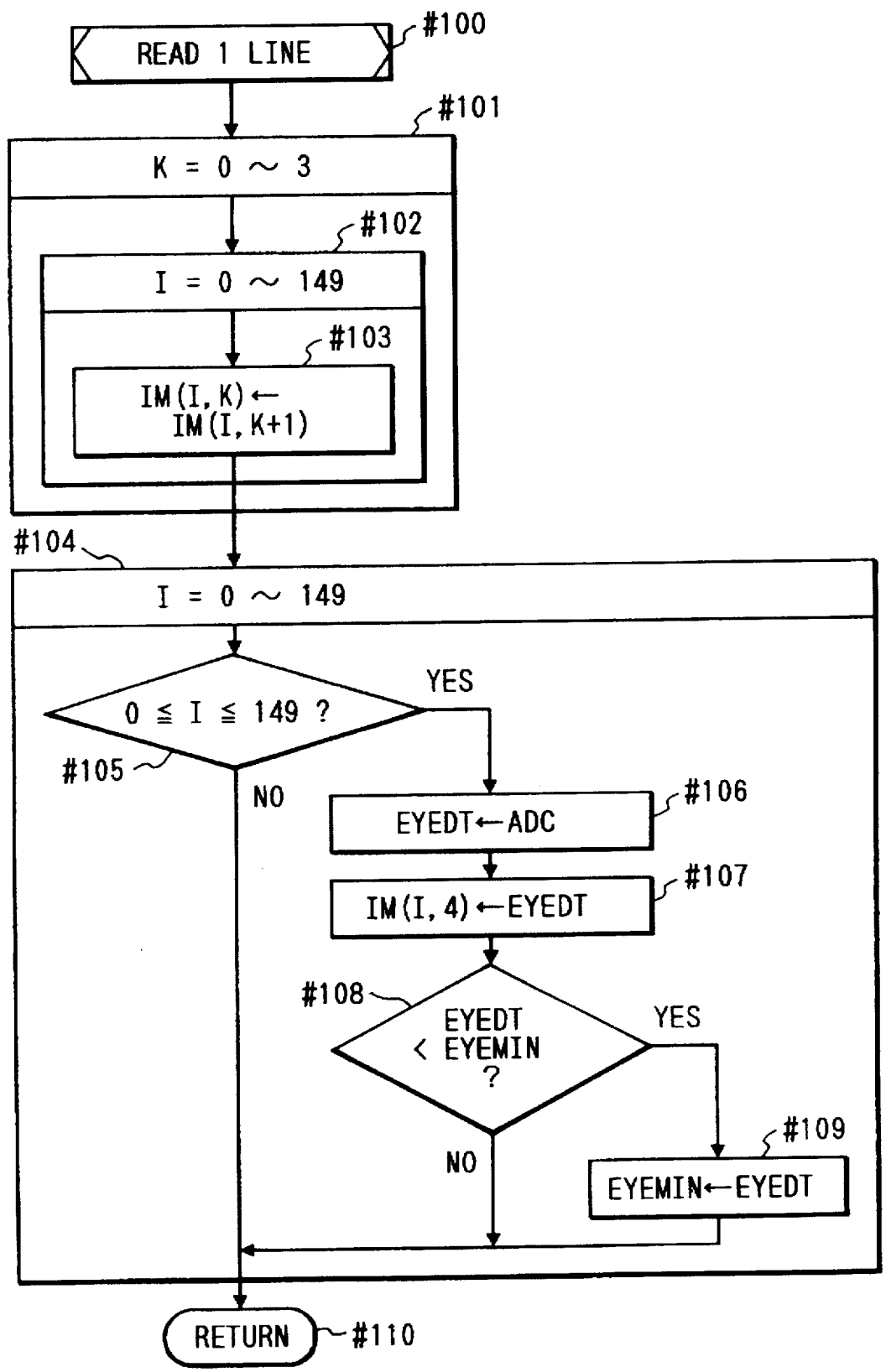
FIG. 8 is a flow chart showing the "one-line read" operation of the camera according to the first embodiment of the present invention.

The one-line read operation is executed in the form of a subroutine, and FIG. 8 is a flow chart showing the "one-line read" subroutine.

Referring to FIG. 8, when this "one-line read" subroutine is called in step (#100), step (#101) is executed. Step (#101) and step (#102) in the frame of step (#101) execute the same loop processing as that in step (#006) described above. Processing in the frame is executed in step (#101) while counting up a variable K from 0 to 3, and processing in the frame is executed in step (#102) while counting up a variable I from 0 to 149. Therefore, steps (#101) and (#102) execute so-called "nested" loop processing of the variables K and I.

In step (#103) in the loop processing in step (#102), a re-storage operation of array variables IM(I, K) is performed.

In this embodiment, the MPU 100 executes signal processing. In general, the storage capacity of an internal RAM (random access memory) of a microcomputer is not large enough to simultaneously store all the pieces of picture element information from the area sensor. Thus, in this embodiment, only the latest image signals corresponding to five lines in the horizontal direction (x-axis) are stored in the internal RAM of the microcomputer, and processing for line of sight detection is executed each time signals for one line are read.

The execution contents of the double loop processing from steps (#101) to (#103) include an operation for updating stored image signal data for last five lines so as to read image signals for one new line. More specifically, of the array variables IM(I, K), the variables IM(I, 0) [I=0 to 149] represent image data for the oldest line, and the variables IM(I, 4) [I=0 to 149] represent image data for the latest line. Then, data are updated as follows to prepare for storing image signals for a new line in the variables IM(I, 4) [I=0 to 149].

IM(I, 0)←IM(I, 1)
IM(I, 1)←IM(I, 2)
IM(I, 2)←IM(I, 3)
IM(I, 3)←IM(I, 4) [I=0 to 149]

Upon completion of the loop processing for updating data in steps (#101) to (#103), loop processing in step (#104) is executed.

In the loop processing in step (#104), only signals in a limited area are A/D-converted and stored in the RAM, and a minimum value of these image signals is detected while outputting image signals for one line (150 picture elements) in the horizontal direction (x-axis) of the area sensor.

If it is determined in step (#105) that the value I (x-coordinate) falls outside the range from 0 to 149, the loop processing in step (#104) ends.

On the other hand, when the value of the variable I falls within the range from 0 to 149, the flow advances to step (#106), and the MPU 100 temporarily stores an A/D-converted value ADC of each image signal in a variable EYEDT.

In step (#107), the value EYEDT is stored in the corresponding array variable IM(I, 4). The variable I is counted up from 0 to 149 in outer loop processing step (#104).

Steps (#108) and (#109) execute minimum value detection processing of image signals. A variable EYEMIN holds a minimum value of image signals. If it is determined in step (#108) that EYEDT is smaller than EYEMIN, the flow branches to step (#109), and EYEMIN is updated by the smaller value EYEDT.

Upon completion of the loop processing in steps (#104) to (#109), i.e., upon completion of the storage operation of image signals for one new line and the detection operation of the minimum value, the control returns from the "one-line read" subroutine to the main routine in step (#110).

Figure 7:
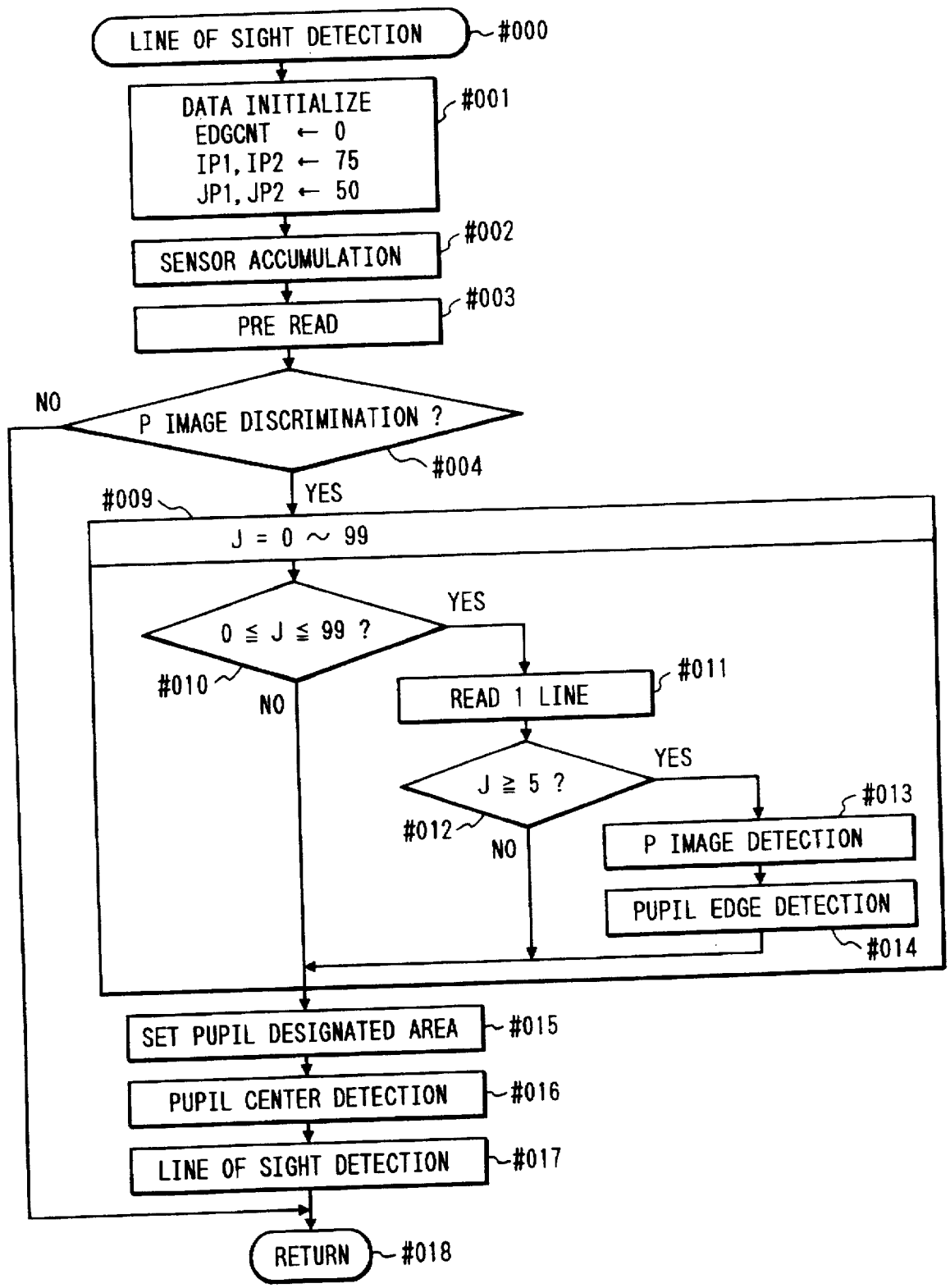
FIG. 7 is a flow chart showing the "line of sight detection" operation of the camera according to the first embodiment of the present invention.

Referring back to the flow chart in FIG. 7, when the "one-line read" subroutine ends in step (#011), the flow advances to step (#012) to check if the loop variable J in the outer loop processing step (#009) is equal to or larger than 5.

The loop variable J represents the picture element line in the vertical direction (y-axis) of the area sensor. In this embodiment, since the number of picture elements of the area sensor is assumed to be "150×100", J is counted up from 0 to 99.

If it is determined in step (#012) that the loop variable J is equal to or larger than 5, the flow branches to step (#013). This is because when the number of lines of the read image signals becomes equal to or larger than 5, processing in the vertical direction (y-axis) of the area sensor is allowed.

In step (#013) as the branch destination, a "P image detection" subroutine is executed.

Figure 9:
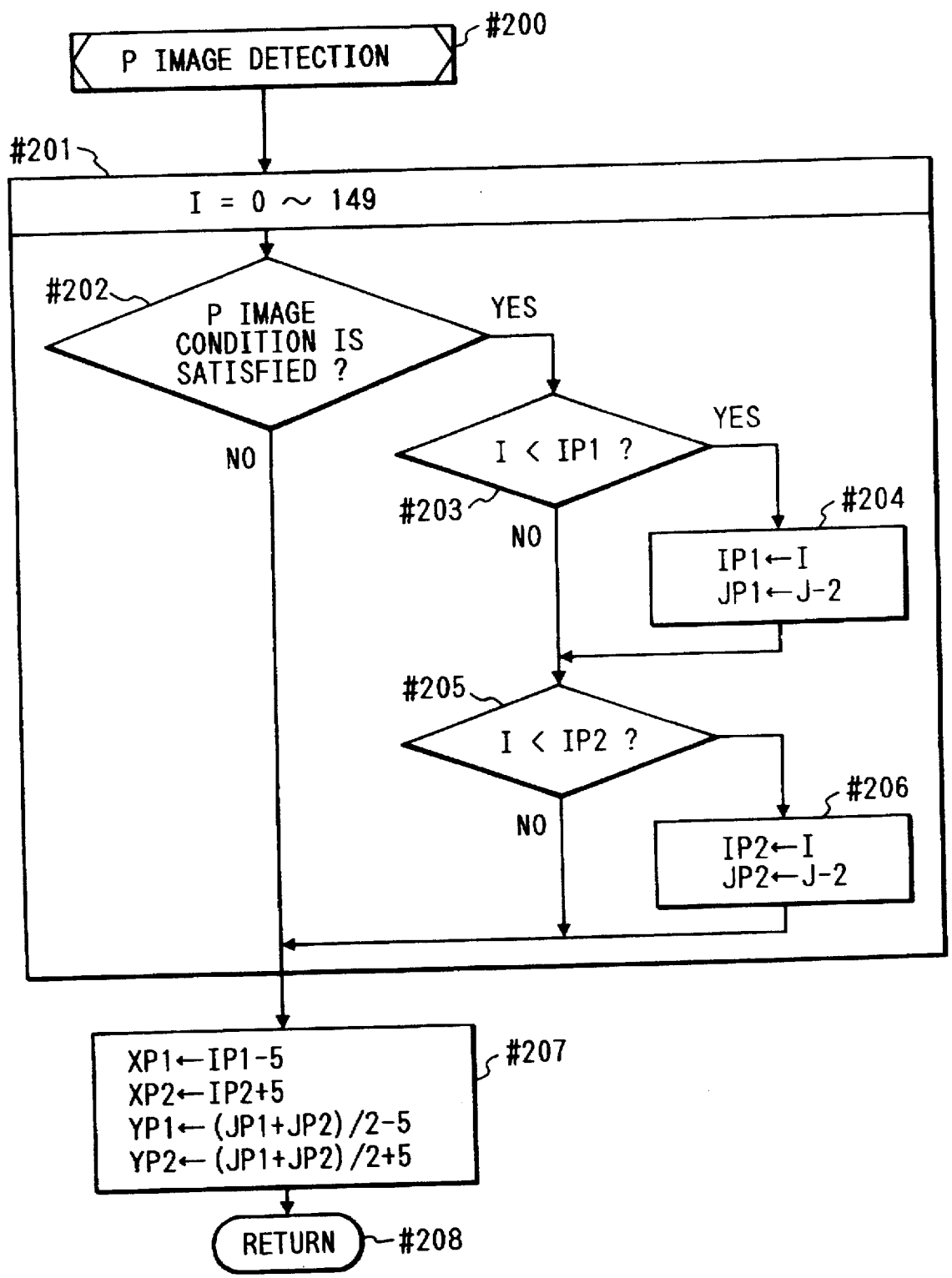
FIG. 9 is a flow chart showing the "P image detection operation" of the camera according to the first embodiment of the present invention.

The "P image detection" subroutine is the above-mentioned processing for detecting the positions of the P images, and is executed each time one line in the horizontal direction (x-axis) of the area sensor is read. FIG. 9 is a flow chart showing the "P image detection" subroutine.

Referring to FIG. 9, when the "P image detection" subroutine is called in step (#200), loop processing in step (#201) is executed.

In this step, loop processing is performed within the range from I=0 to 149. In the loop processing, the position of a P image in image data [stored in the array variables IM(I, K)] is searched. If the position of a P image is found, the position on the area sensor is stored. In this embodiment, since two P images are generated, two pieces of position information are stored.

In first step (#202) in the loop, it is checked if image data at a predetermined position satisfies a condition as a P image. The condition is as follows:

"P Image Condition" in Step (#202)

IM(I, 2)>C1
and IM(I, 1)>C2
and IM(I, 3)>C2
and IM(I−1, 2)>C2
and IM(I+1, 2)>C2 where C1 and C2 are threshold value constants, and satisfy "C1≧C2".

Figure 15:
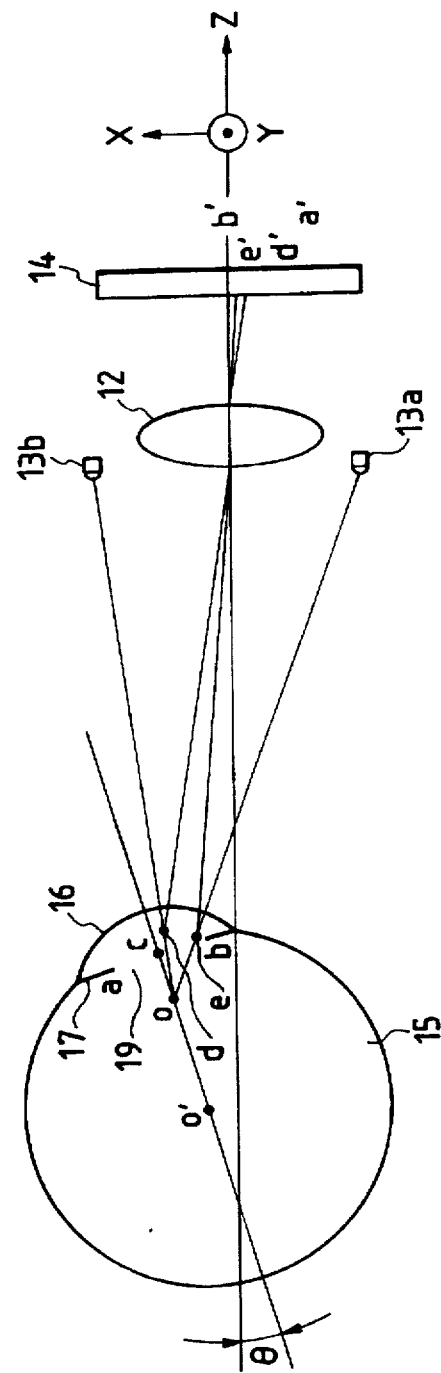
FIG. 15 is a view for explaining the principle of line of sight detection in the general line of sight detection apparatus.
Figure 16A:
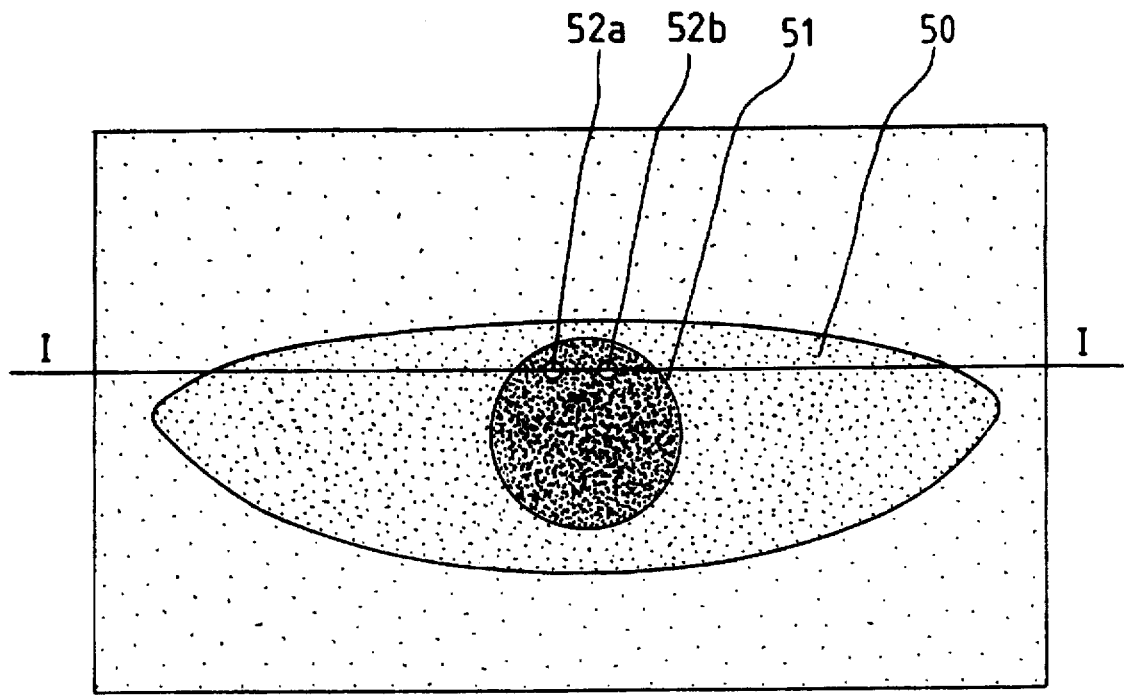
FIGS. 16A and 16B are views showing the eyeball image projected onto an area sensor shown in FIG. 15, and the output from the sensor.
Figure 16B:
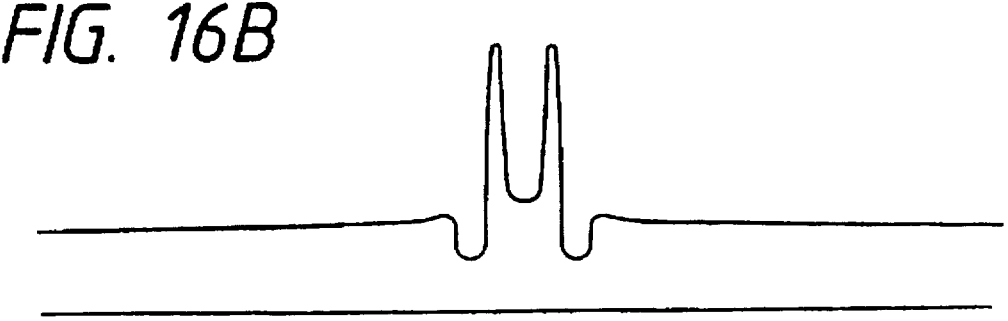
Figure 17:
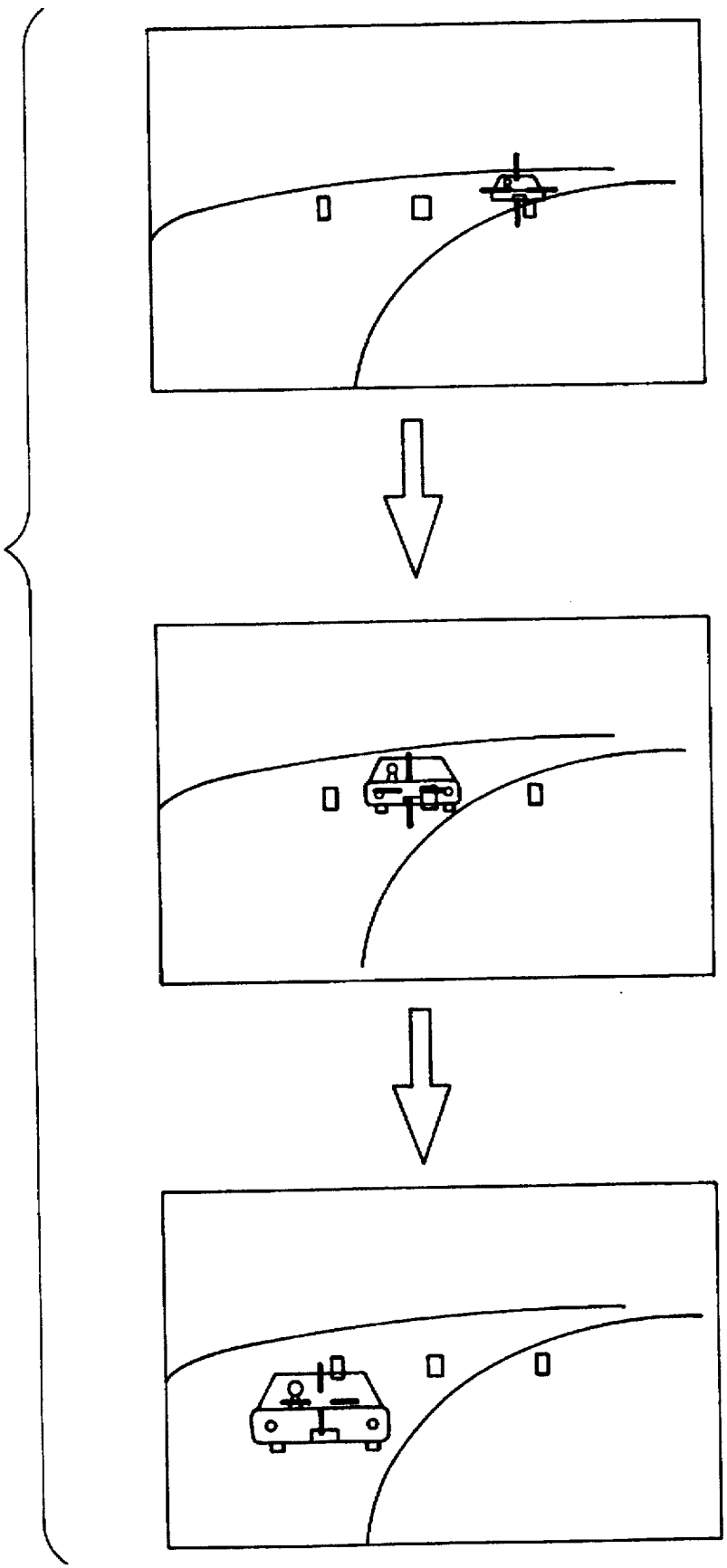
FIG. 17 is a view showing a state of continuous focus adjustment performed for a moving object using the line of sight detection function.

The condition is defined in two directions, i.e., the horizontal and vertical directions (x- and y-axes) while paying attention to the fact that the P image is like a spot image, as has been described above with reference to FIG. 15. If this condition is satisfied, it is determined that a P image is present at a position (I, 2).

As described above, the array variables IM(I, K) are updated each time one line in the horizontal direction (x-axis) of the area sensor is read, and data for a line at the position J in the vertical direction (y-axis) are stored in IM(I, 4) [I=1 to 149]. Therefore, an address (I, 2) with respect to the variable IM corresponds to a position (I, J−2) on the area sensor.

If image data satisfying the P image condition is found in step (#202), the flow branches to step (#203) and the subsequent steps; otherwise, the outer loop variable I is counted up.

In step (#203) and the subsequent steps, processing for determining the presence range (the range [IP1 to IP2] in the x-axis direction and the range [JP1 to JP2] in the y-axis direction of the two P images is performed.

In step (#203), the variable I representing the position, in the horizontal direction (x-axis), of the area sensor is compared with the variable IP1. If "I<IP1", the flow branches to step (#204). More specifically, if the position of the variable I is present on the left side of the left P image position IP1 in the horizontal direction, in the presence range of the P image, IP1 is rewritten.

In step (#204), the value of the variable I is stored in the variable IP1, and the position (J−2) in the vertical direction at that time is stored in the variable JP1.

In steps (#205) and (#206), the right P image position IP2 in the horizontal direction and the position JP2 in the vertical direction in the P image presence range are updated.

As described above, in the loop processing in step (#201), upon completion of the processing for one line corresponding to the position I=0 to 149 in the horizontal direction, the flow advances to step (#207).

In step (#207), variables xP1, xP2, yP1, and yP2 to be looked up in image processing are calculated using formulas shown in FIG. 9.

These variables are used for removing pupil edge information generated around the P image positions upon detection of the center of the pupil.

Upon completion of the processing in step (#207), the control returns from the "P image detection" subroutine to the main routine in step (#208).

A description will be continued with reference to the flow chart in FIG. 7 again.

Upon completion of the "P image detection" subroutine in step (#013), a "pupil edge detection" subroutine is executed in step (#014).

The "pupil edge detection" subroutine detects the position of the pupil edge (the boundary between the iris and pupil) in the eyeball reflection image.

The pupil edge is detected by a predetermined algorithm. However, since this algorithm is not directly related to the gist of this embodiment, a detailed description thereof will be omitted.

Upon completion of the "pupil edge detection" subroutine in step (#014), the loop variable J (representing the position in the vertical direction, i.e., the y-coordinate of the area sensor) in the outer loop processing step (#009) is counted up, and the processing in step (#010) and the subsequent steps is executed until J reaches 99.

If the loop variable J has reached 99 and the read processing of all the picture elements of the area sensor has ended, the flow advances from step (#009) to step (#015).

In step (#015), a "pupil designation range setting" subroutine is executed. This subroutine removes false edge points which are generated by various noise components and included in a plurality of edge points detected in the "pupil edge detection" subroutine in step (#104) in addition to those representing the pupil circle (a circle defined by the boundary between the iris and pupil).

In this subroutine, the coordinates of probable edge points are limited based on the P image position information. However, a detailed description of this subroutine will be omitted here.

In step (#016), a "pupil center detection" subroutine is executed. This subroutine estimates the shape of the pupil circle on the basis of the probable pupil edge points so as to obtain the central coordinate, and uses the "method of least squares". A detailed description of this subroutine will be omitted here.

In step (#017), a "line of sight detection" subroutine is executed. The "line of sight detection" subroutine detects the line of sight (gazing point) on the basis of the P images and the central position of the pupil circle detected in the above-mentioned processing.

Basically, as in the above-mentioned prior art, the rotation angle θ of the eyeball optical axis can be calculated in accordance with formula (2).

Referring back to FIG. 5, upon completion of the line of sight detection subroutine in step (#03), the flow advances to step (#04). In step (#04), the power supply of the line of sight detection circuit is turned on, and the operation frequency of the MPU 100 is decreased to ½, thus suppressing the consumption current in the subsequent routines.

In step (#03) for performing the line of sight detection operation, since a very large amount of calculation processing is generated, a very long time is required for line of sight detection unless the operation frequency of the MPU 100 is maximized. However, since a step other than the line of sight detection operation, e.g., step (#05) for performing a focus detection operation does not require a large calculation processing amount, unlike in the line of sight detection processing, the operation frequency of the MPU 100 can be lowered to attain power saving.

In step (#05), the focus detection operation is performed. This operation is performed based on the known phase difference detection method using the focus detection circuit 105, as described above. In step (#06), the MPU 100 controls the lens control circuit in accordance with the focusing state detected by the focus detection operation, thus attaining focus adjustment of the lens.

In step (#07), since a photometric operation to be executed in the next step (#08) requires a further smaller amount of calculation processing, the operation frequency is decreased to be 1/16. In step (#08), the MPU 100 determines an exposure amount on the basis of luminance information of an object from the photometric circuit 106.

In step (#09), a feeding finish flag indicating whether or not the camera is in a film feeding state is checked. If the flag is 0, since a continuous feeding operation is being performed currently, the flow returns to step (#01) to repeat the operations in steps (#01) to (#09).

On the other hand, if the feeding finish flag is 1, the flow advances to step (#10) to check if the switch SW2, which is turned on at the second stroke position of the release button, is ON. If the switch SW2 is OFF, the flow returns to step (#01) to repeat the operations in steps (#01) to (#10).

If the feeding finish flag is 1 and the switch SW2 is ON, a series of "exposure operations" in steps (#11) to (#15) are started.

In step (#11), the main mirror 2 is moved upward prior to the exposure operation, and is retracted from the phototaking optical path. In step (#12), the aperture 31 in the lens 1 is driven via the lens control circuit 112 to have an aperture value based on the determined exposure amount. In step (#13), the shutter is controlled by the shutter control circuit 107 to have a shutter release time (shutter speed) based on the determined exposure amount.

In step (#14), the main mirror 2, which was retracted from the phototaking optical path, is moved downward, and is obliquely inserted in the phototaking optical path again. In step (#15), the motor control circuit 108 starts a film feeding operation to wind up the film by one frame, and the feeding finish flag is set to be 0, thus setting interruption processing. Thereafter, the control waits for a film feeding finish signal from the film running detection circuit 109, and returns to step (#01).

Figure 6:
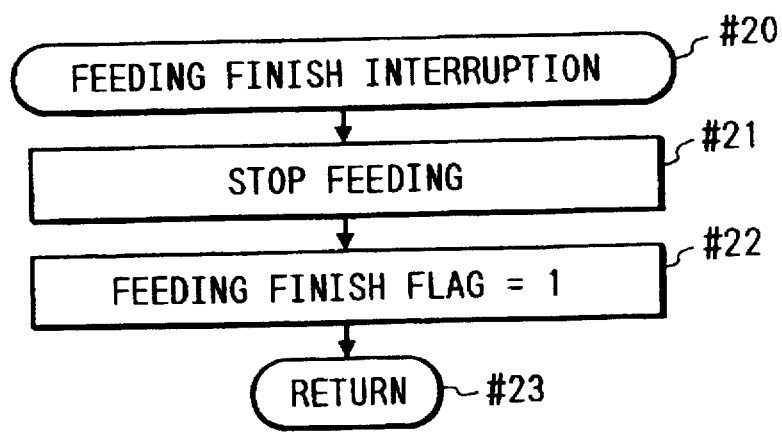
FIG. 6 is a flow chart showing the "feeding finish interruption" operation of the camera according to the first embodiment of the present invention.

The feeding finish interruption routine will be described below with reference to FIG. 6.

When the camera operation is in any one of steps (#01) to (#09), if the film running detection circuit 109 generates a film feeding finish interruption, the flow advances from step (#20) to step (#21).

In step (#21), the MPU 100 supplies a signal to the motor control circuit 108 to stop the feeding operation, thus ending the wind-up operation of the film by one frame. In step (#22), the feeding finish flag is set to be 1, and the flow returns to the main routine in step (#23).

As has been described above with reference to the flow charts, when the ON state of the release button is held at its first stroke position, the "line of sight detection operation", "focus detection operation", and "photometric operation" are repetitively performed. On the other hand, when the ON state of the release button is held at its second stroke position, the "line of sight detection operation", "focus detection operation", "photometric operation", and "exposure operation" are performed.

Figure 12A:
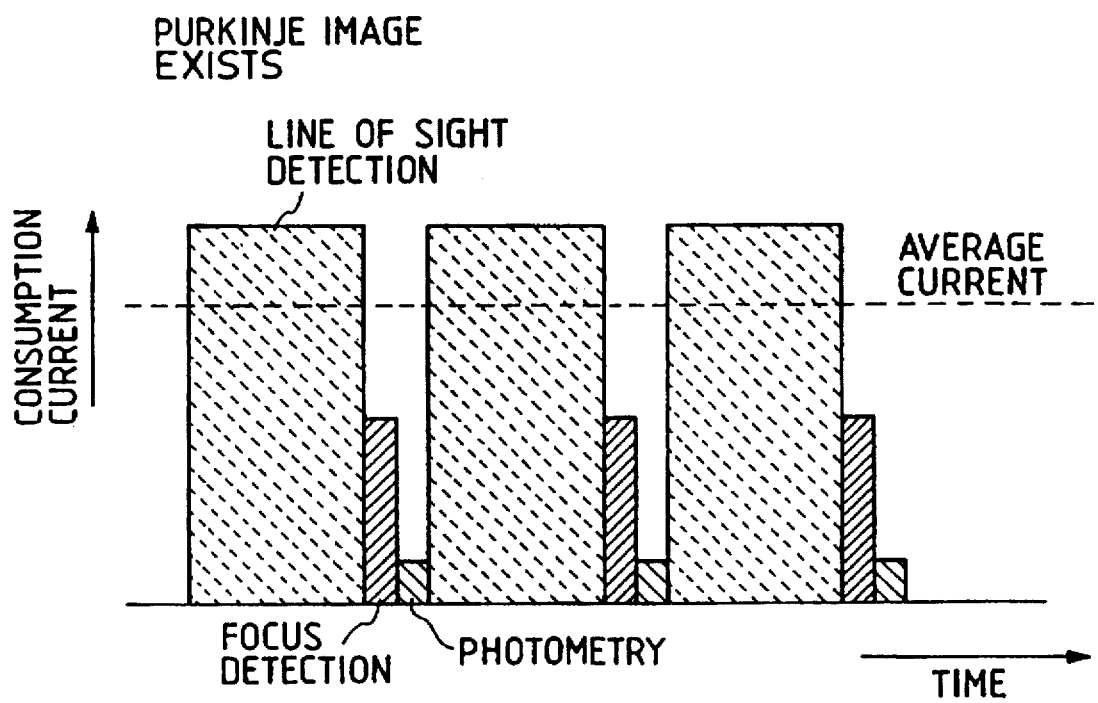
FIGS. 12A and 12B are views for explaining the consumption currents depending on the presence/absence of P images of the camera according to the respective embodiments of the present invention.
Figure 12B:
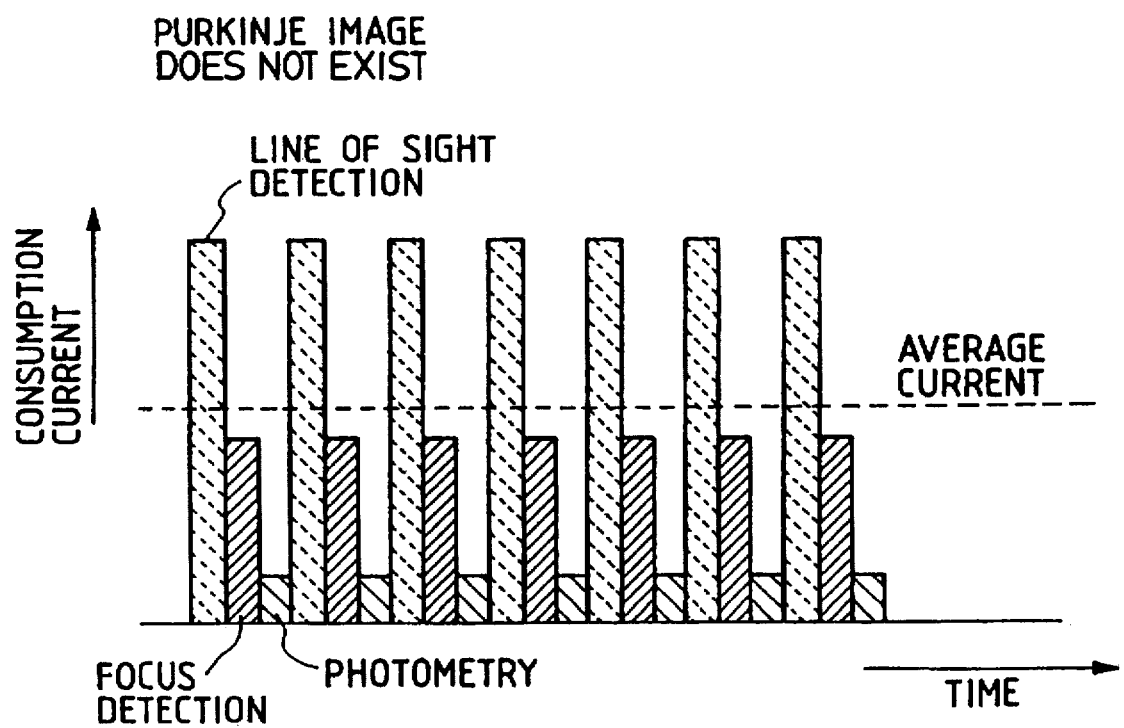

FIGS. 12A and 12B show a change in consumption current when the ON state of the release button is held at its first stroke position in the camera operation of this embodiment.

When the photographer looks into the finder and P images for line of sight detection exist (see FIG. 12A), since the line of sight detection operation continues for a long period of time and the consumption current is large, the average consumption current in the entire sequence has a value close to the consumption current in the line of sight detection operation. However, when the photographer does not look into the finder, and no P images for line of sight detection exist (see FIG. 12B), since the line of sight detection operation finishes within a short period of time, the average consumption current in the entire sequence lowers very much.

As described above, in the first embodiment, prior to the calculations of the gazing point (line of sight) of the observer by A/D-converting respective picture element outputs from the area sensor 14 and executing sequential processing of the A/D-converted values, the area sensor 14 is divided into blocks in units of horizontal lines, and the output values from maximum output picture elements in the respective lines (blocks) are A/D-converted to detect the presence/absence of P images. In this case, if it is detected that the observer does not look into the finder, the line of sight detection operation is suspended. As a result, the time required for operating the MPU 100 at the maximum operation frequency 1/1 can be shortened, and the consumption current can be greatly reduced in the entire camera operation.

Second Embodiment

The second embodiment of the pre-read operation in step (#003) will be described below with reference to the timing chart in FIG. 11.

In FIG. 11, the <base clamp>, <sequential reset>, and <accumulation> operations are the same as those in FIG. 10.

The pre-read operation in FIG. 11 is the same as the main read operation in FIG. 10 in a hardware manner, and signals are read from a terminal 220 in turn by an MPU 100 from the first line. At this time, a comparator 241 compares the picture element of interest with a reference potential vref1, and if the picture element output is equal to or higher than a predetermined level, an output C1 (242) generates a signal "1" in association with the picture element of interest.

When a pulse φCL (240) is enabled, the picture element output of the previous picture element is clamped at one terminal of the capacitor C3, and thereafter, the pulse φCL (240) is disabled to read the next picture element output, thereby inputting the difference output from the previous picture element to a comparator 243. The comparator 243 compares the input difference with a reference potential Vref2, and if a difference picture element output equal to or higher than a predetermined level is found, an output C2 (244) generates a signal "1" in association with the picture element of interest.

If both the outputs C1 (242) and C2 (244) are "1" for the picture element of interest, the picture element is considered to be a P image candidate, since it satisfies the P image detection condition that a picture element is like a spot image having a predetermined luminance level or higher.

The method of searching P image candidates on the basis of the output signals C1 (242) and C2 (244) from the MPU 100 can be completed within a shorter period of time than the method of obtaining the P images by calculations of the A/D-converted values, as has been described above with reference to FIG. 9.

If it is determined in step (#004) in FIG. 7 that two or more P image candidates are obtained, it is determined that P images exist, and the photographer looks into the finder, and the flow advances to step (#009) and the subsequent steps. On the other hand, if the number of P image candidates is one or fewer, it is determined that the photographer does not look into the finder, and the line of sight detection operation ends in step (#018).

The operations in step (#009) and the subsequent steps are the same as those in the first embodiment, and a detailed description thereof will be omitted.

As described above, according to the second embodiment, prior to the calculations of the gazing point (line of sight) of the observer by A/D-converting respective picture element outputs from an area sensor 14 and executing sequential processing of the A/D-converted values, the feature points of the eyeball image are detected by analog processing simultaneously with the high-speed read operation of the area sensor 14. If it is detected based on the presence/absence of the feature points that the observer does not look into the finder, the line of sight detection operation is suspended immediately. The first embodiment may erroneously detect that the observer looks into the finder when an image on the area sensor simply has a predetermined luminance level, even through the observer does not actually look into the finder. However, in the second embodiment, although the time required for the pre-read operation is not much shorter than that in the first embodiment, a discrimination probability increases in consideration of the feature point indicating that a P image is a spot image, thus realizing further power saving.

Third Embodiment

Figure 13:
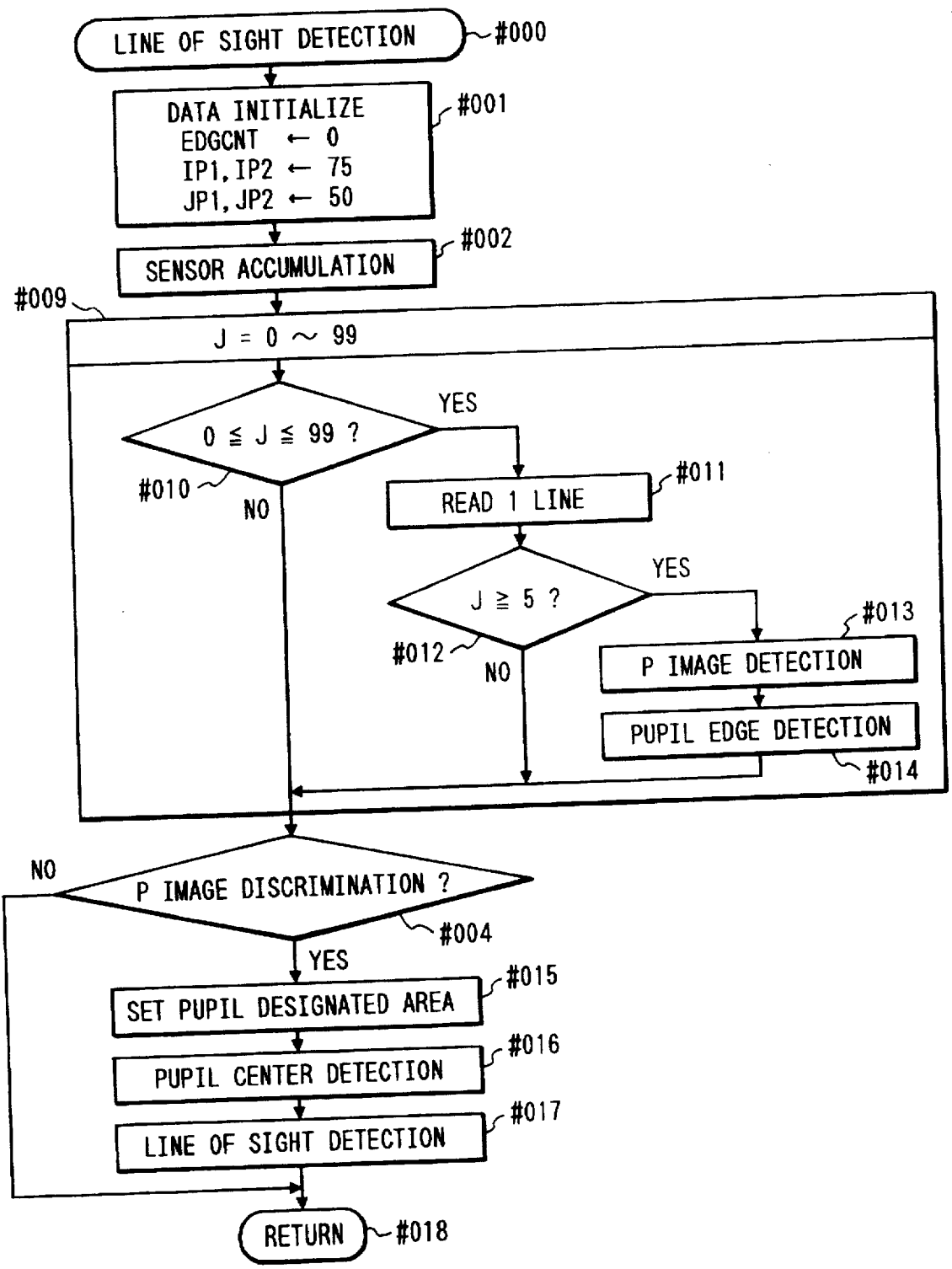
FIG. 13 is a flow chart showing the "line of sight detection" operation of a camera according to the third embodiment of the present invention.
Figure 14:
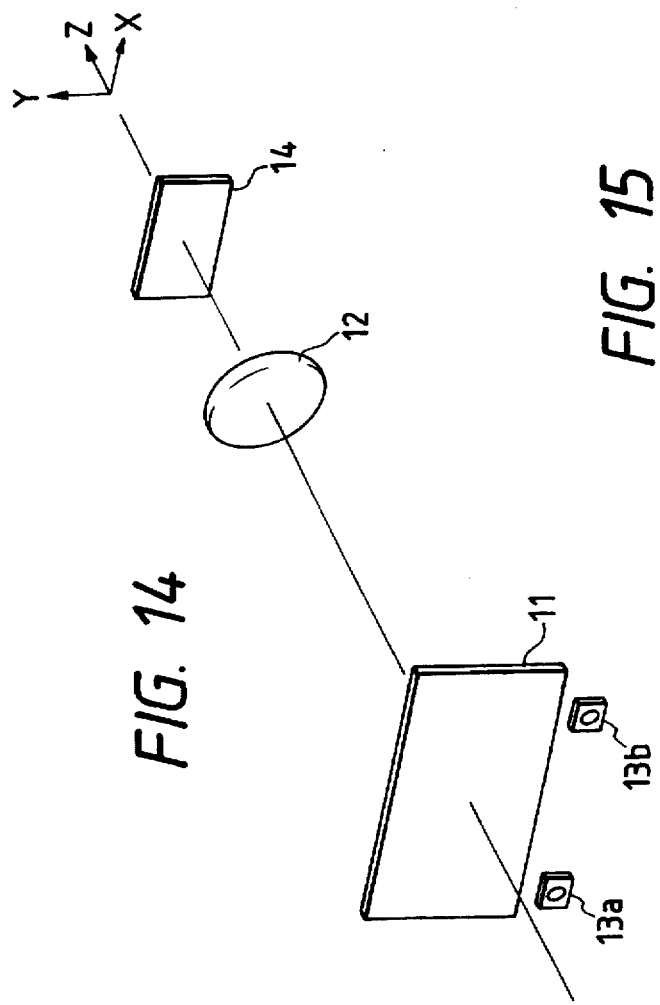
FIG. 14 is a perspective view showing a line of sight detection optical system built in a general line of sight detection apparatus.

The third embodiment of the line of sight detection operation in step (#03) will be described below with reference to the flow chart in FIG. 13. The same step numbers denote steps that execute the same operations as in FIG. 7.

In the third embodiment, after sensor accumulation (#002), the loop processing in step (#009) and the subsequent steps are executed without performing the pre-read operation (#003) and P image discrimination (#004). Upon completion of this loop processing, P image discrimination in step (#004) is performed. If it is determined that no P images formed by the eyeball image of the photographer exist on an area sensor 14, i.e., if variables IP1, IP2, JP1, and JP2 indicating the positions of the P images remain set in initial values, since the subsequent line of sight detection operation need not be performed, the flow advances to step (#018), thus ending the line of sight detection subroutine. If the variables IP1, IP2, JP1, and JP2 are updated from the initial values, and it is determined that P images exist, the flow advances to step (#015) and the subsequent steps.

As described above, since the third embodiment has a larger number of steps than in the first and second embodiments before discrimination of the presence/absence of P images, the effect of reducing the consumption current and increasing the processing speed slightly lowers. However, since this embodiment does not require any new hardware circuits for the pre-read operation, the effect of the present invention can be attained by modifying only software programs of the conventional circuit, thus providing a merit of a simple arrangement.

According to each of the above embodiments, after a line of sight detection sensor, which detects the line of sight by accumulating and reading an eyeball image of the observer, A/D-converting picture element information, and executing sequential processing of the A/D-converted values, and accumulates the eyeball image, the pre-read operation which is completed in a short period of time as compared to the sequential processing is performed, and it is discriminated if the eyeball image of the observer is present. Therefore, a line of sight detection apparatus which can systematically attain power saving, e.g., when the observer does not look into an observation unit in a mode for continuously performing line of sight detection, can be realized.

Correspondence between Invention and Embodiments

In this embodiment, the IREDs 13a to 13d correspond to an illumination means of the present invention, the area sensor 14 corresponds to a light-receiving means of the present invention, a portion for performing the main read operation attained by the MPU 100 and the line of sight detection circuit 104 corresponds to a first signal read processing means of the present invention, and a portion for performing A/D conversion, P image detection, pupil edge detection, and the like attained by the MPU 100 corresponds to a feature point extraction means.

A portion for performing the pre-read operation attained by the MPU 100 and the line of sight detection circuit 104 corresponds to a second read processing means of the present invention, and a portion for performing P image discrimination in step (#004) in FIG. 7 by the MPU 100 corresponds to a discrimination means of the present invention.

A portion for performing the pre-read operation of the first embodiment corresponds to a means for reading and processing signals associated with respective blocks in claim 4, and a portion for performing the pre-read operation of the second embodiment corresponds to a means for reading and processing analog-processed second signals in claim 6.

In each of the above embodiments, the present invention is applied to a single-lens reflex camera. However, the present invention may be applied to other cameras such as a lens-shutter camera, a video camera, and the like. Furthermore, the present invention may be applied to other optical equipment, other apparatuses, and a constituting unit of other equipment.

Furthermore, the present invention may be applied to an arrangement as an appropriate combination of the above embodiments or their techniques.

As described above, according to the present invention, a peak signal read by a peak read processing means before a line of sight detection operation is A/D-converted, and it is checked based on the A/D-converted value if a Purkinje image associated with an eyeball image of an observer is present on a light-receiving means, or the peak signal is analog-processed, and it is checked based on the analog value if a Purkinje image associated with an eyeball image of an observer is present on the light-receiving means. If the Purkinje image is present on the light-receiving means, since the observer looks into the finder with a high possibility, read processing in units of picture elements of the area sensor is performed, image information associated with the eyeball image of the observer is extracted from the read processing result, and the line of sight of the observer is detected based on the image information. If the Purkinje image is not present on the light-receiving means, since the observer does not look into the finder with a high possibility, the line of sight detection operation is suspended.

Therefore, when the observer does not look into an eyepiece portion with a high possibility, the line of sight detection operation is suspended, thus reducing the consumption power.

What is claimed is:

1. A device for detecting a line of sight, comprising:
    a) image pick-up means for picking up an eyeball image of a user;
    b) line of sight detection means for detecting the line of sight of said user by calculating an output from said image pick-up means;
    c) maximum value detection means for detecting a maximum output value output from said image pick-up means;
    d) comparison means for comparing said maximum value with a predetermined threshold value; and e) inhibition means for inhibiting a line of sight detection operation of said line of sight detection means when said maximum value is smaller than said threshold value.

2. A device according to claim 1, wherein said image pick-up means comprises a storage type image sensor which has a plurality of picture elements, and allows a non-destructive reading operation.

3. A device according to claim 1, wherein said line of sight detection means detects the line of sight of said user by detecting at least a position of a Purkinje image from said eyeball image picked up by said image pick-up means.

4. A device according to claim 3, wherein said line of sight detection means detects the line of sight of said user by detecting a relative position between the Purkinje image and a pupil from said eyeball image picked up by said image pick-up means.

5. A device according to claim 1, wherein said maximum value detection means detects maximum values in units of blocks by reading a plurality of picture elements included in said image pick-up means in units of blocks.

6. A device for detecting a line of sight, comprising:
   a) image pick-up means for picking up an eyeball image of a user;
   b) line of sight detection means for detecting the line of sight of said user on the basis of an output from said image pick-up means;
   c) maximum value detection means for detecting a maximum output value output from said image pick-up means;
   d) determination means for determining if said maximum value satisfies a predetermined condition; and
   e) inhibition means for inhibiting a line of sight detection operation of said line of sight detection means when said determination means determines that said maximum value does not satisfy said predetermined condition.

7. A device according to claim 6, wherein said image pick-up means comprises a storage type image sensor which has a plurality of picture elements, and allows a non-destructive reading operation.

8. A device according to claim 6, wherein said line of sight detection means detects the line of sight of said user by detecting at least a position of a Purkinje image from said eyeball image picked up by said image pick-up means.

9. A device according to claim 8, wherein said line of sight detection means detects the line of sight of said user by detecting a relative position between the Purkinje image and a pupil from said eyeball image picked up by said image pick-up means.

10. A device according to claim 6, wherein said maximum value detection means detects maximum values in units of blocks by reading a plurality of picture elements included in said image pick-up means in units of blocks.

11. A device for detecting a line of sight, comprising:
    a) image pick-up means, having a plurality of picture elements, for picking up an eyeball image of a user;
    b) line of sight detection means for detecting the line of sight of said user on the basis of an output from said image pick-up means;
    c) determination means for determining if a picture element that satisfies a predetermined condition is present in said plurality of picture elements; and
    d) inhibition means for inhibiting a line of sight detection operation of said line of sight detection means when said determination means determines that any picture element that satisfies said predetermined condition is not present in said plurality of picture elements.

12. A device according to claim 11, wherein said image pick-up means comprises a storage type image sensor which allows a non-destructive reading operation.

13. A device according to claim 11, wherein said line of sight detection means detects the line of sight of said user by detecting at least a position of a Purkinje image from said eyeball image picked up by said image pick-up means.

14. A device according to claim 13, wherein said line of sight detection means detects the line of sight of said user by detecting a relative position between the Purkinje image and a pupil from said eyeball image picked up by said image pick-up means.

15. A device according to claim 13, wherein said predetermined condition is that said eyeball image picked up by said image pick-up means includes the Purkinje image.

16. A device according to claim 11, wherein said predetermined condition is that an absolute value of a picture element output is equal to or larger than a first predetermined value, and an output difference between the picture element output and an adjacent picture element is equal to or larger than a second predetermined value different from the first predetermined value.

17. A device for detecting a line of sight, comprising:
    a) image pick-up means for picking up an eyeball image of a user;
    b) line of sight detection means for detecting the line of sight of said user on the basis of an output from said image pick-up means;
    c) maximum value detection means for detecting a maximum output value output from said image pick-up means;
    d) determination means for determining if said maximum value satisfies a predetermined condition; and
    e) line of sight detection control means for, when said determination means determines that said maximum value satisfies said predetermined condition, permitting a line of sight detection operation of said line of sight detection means, and for, when said determination means determines that said maximum value does not satisfy said predetermined condition, inhibiting the line of sight detection operation of said line of sight detection means.

18. A device according to claim 17, wherein said image pick-up means comprises a storage type image sensor which has a plurality of picture elements, and allows a non-destructive reading operation.

19. A device according to claim 17, wherein said line of sight detection means detects the line of sight of said user by detecting at least a position of a Purkinje image from said eyeball image picked up by said image pick-up means.

20. A device according to claim 19, wherein said line of sight detection means detects the line of sight of said user by detecting a relative position between the Purkinje image and a pupil from said eyeball image picked up by said image pick-up means.

21. A device according to claim 17, wherein said maximum value detection means detects maximum values in units of blocks by reading a plurality of picture elements included in said image pick-up means in units of blocks.

22. A device for detecting a line of sight, comprising:
    a) an image pick-up element for picking up an eyeball image of a user;
    b) a line of sight detection circuit for detecting the line of sight of said user on the basis of an output from said image pick-up element;

c) a maximum value detection circuit for detecting a maximum output value output from said image pick-up element;

d) a determination circuit for determining if said maximum value satisfies a predetermined condition; and e) an inhibition circuit for inhibiting a line of sight detection operation of said line of sight detection circuit when said determination circuit determines that said maximum value does not satisfy said predetermined condition.

23. A device according to claim 22, wherein said image pick-up element comprises a storage type image sensor which has a plurality of picture elements, and allows a non-destructive reading operation.

24. A device according to claim 22, wherein said line of sight detection circuit detects the line of sight of said user by detecting at least a position of a Purkinje image from said eyeball image picked up by said image pick-up element.

25. A device according to claim 24, wherein said line of sight detection circuit detects the line of sight of said user by detecting a relative position between the Purkinje image and a pupil from said eyeball image picked up by said image pick-up element.

26. A device according to claim 22, wherein said maximum value detection circuit detects maximum values in units of blocks by reading a plurality of picture elements included in said image pick-up element in units of blocks.

27. A device according to claim 22, wherein said line of sight detection circuit, said maximum value detection circuit, said determination circuit, and said inhibition circuit comprise a microcomputer, and said microcomputer executes a predetermined algorithm.

28. An equipment having a device for detecting a line of sight, comprising:

a) image pick-up means for picking up an eyeball image of a user;

b) line of sight detection means for detecting the line of sight of said user by calculating an output from said image pick-up means;

c) maximum value detection means for detecting a maximum output value output from said image pick-up means;

d) comparison means for comparing said maximum value with a predetermined threshold value; and e) inhibition means for inhibiting a line of sight detection operation of said line of sight detection means when said maximum value is smaller than said threshold value.

29. An equipment according to claim 28, wherein said image pick-up means comprises a storage type image sensor which has a plurality of picture elements, and allows a non-destructive reading operation.

30. An equipment according to claim 28, wherein said line of sight detection means detects the line of sight of said user by detecting at least a position of a Purkinje image from said eyeball image picked up by said image pick-up means.

31. An equipment according to claim 30, wherein said line of sight detection means detects the line of sight of said user by detecting a relative position between the Purkinje image and a pupil from said eyeball image picked up by said image pick-up means.

32. An equipment according to claim 28, wherein said maximum value detection means detects maximum values in units of blocks by reading a plurality of picture elements included in said image pick-up means in units of blocks.

33. An equipment having a device for detecting a line of sight, comprising:

a) image pick-up means for picking up an eyeball image of a user;

b) line of sight detection means for detecting the line of sight of said user on the basis of an output from said image pick-up means;

c) maximum value detection means for detecting a maximum output value output from said image pick-up means;

d) determination means for determining if said maximum value satisfies a predetermined condition; and e) inhibition means for inhibiting a line of sight detection operation of said line of sight detection means when said determination means determines that said maximum value does not satisfy said predetermined condition.

34. An equipment according to claim 33, wherein said image pick-up means comprises a storage type image sensor which has a plurality of picture elements, and allows a non-destructive reading operation.

35. An equipment according to claim 33, wherein said line of sight detection means detects the line of sight of said user by detecting at least a position of a Purkinje image from said eyeball image picked up by said image pick-up means.

36. An equipment according to claim 35, wherein said line of sight detection means detects the line of sight of said user by detecting a relative position between the Purkinje image and a pupil from said eyeball image picked up by said image pick-up means.

37. An equipment according to claim 33, wherein said maximum value detection means detects maximum values in units of blocks by reading a plurality of picture elements included in said image pick-up means in units of blocks.

* * * * *

UNITED STATES PATENT AND TRADEMARK OFFICE
CERTIFICATE OF CORRECTION

PATENT NO. : 5,706,071  Page 1 of 2
DATED : January 6, 1998
INVENTOR(S) : TATSUYUKI TOKUNAGA It is certified that error appears in the above-identified patent and that said Letters Patent is hereby corrected as shown below:

COLUMN 5:

Line 19, "6b" should read --6c--.

COLUMN 6:

Line 13, "and-the" should read --and the--;

COLUMN 8:

Line 31, "AMOS" should read --A MOS--.

COLUMN 11:

Line 67, "for the" should read --for--.

COLUMN 12:

Line 1, "for" should read --for the--.

UNITED STATES PATENT AND TRADEMARK OFFICE
CERTIFICATE OF CORRECTION

PATENT NO. : 5,706,071
DATED : January 6, 1998
INVENTOR(S) : TATSUYUKI TOKUNAGA

It is certified that error appears in the above-identified patent and that said Letters Patent is hereby corrected as shown below:

COLUMN 18:

Line 42, "possibility" should read --probability--;
Line 49, "possibility" should read --probability--; and
Line 52, "possibility" should read --probability--.

Signed and Sealed this

Seventh Day of July, 1998

*Attest:*

BRUCE LEHMAN

*Attesting Officer*     Commissioner of Patents and Trademarks